(12) United States Patent
Nagoya et al.

(10) Patent No.: US 8,336,092 B2
(45) Date of Patent: Dec. 18, 2012

(54) COMMUNICATION CONTROL DEVICE AND COMMUNICATION CONTROL SYSTEM

(75) Inventors: Mitsugu Nagoya, Tokyo (JP); Atsushi Suzuki, Yokohama (JP)

(73) Assignee: Duaxes Corporation (JP)

( * ) Notice: Subject to any disclaimer, the term of this patent is extended or adjusted under 35 U.S.C. 154(b) by 716 days.

(21) Appl. No.: 11/884,526

(22) PCT Filed: Aug. 25, 2005

(86) PCT No.: PCT/JP2005/015480
§ 371 (c)(1),
(2), (4) Date: Sep. 11, 2008

(87) PCT Pub. No.: WO2006/087837
PCT Pub. Date: Aug. 24, 2006

(65) Prior Publication Data
US 2009/0178116 A1    Jul. 9, 2009

(30) Foreign Application Priority Data

Feb. 18, 2005 (JP) ................................. 2005-042755
Mar. 28, 2005 (WO) .................... PCT/JP2005/05789
Jul. 7, 2005 (WO) .................. PCT/JP2005/012605
Jul. 27, 2005 (WO) .................. PCT/JP2005/013772

(51) Int. Cl.
*G06F 9/00* (2006.01)
(52) U.S. Cl. .................. 726/11; 726/12; 726/13; 726/27
(58) Field of Classification Search .............. 726/11–13, 726/27
See application file for complete search history.

(56) References Cited

U.S. PATENT DOCUMENTS

| 4,475,237 A | 10/1984 | Glasby .......................... 382/181 |
| 5,341,479 A | 8/1994 | Dean ................................. 711/4 |
| 5,884,033 A * | 3/1999 | Duvall et al. ................. 709/206 |
| 6,236,678 B1 | 5/2001 | Horton .......................... 375/222 |
| 2006/0069782 A1* | 3/2006 | Manning et al. .............. 709/227 |
| 2006/0095955 A1* | 5/2006 | Vong ................................. 726/3 |
| 2006/0136374 A1* | 6/2006 | Shelest et al. ..................... 707/3 |

FOREIGN PATENT DOCUMENTS

| CN | 1430753 A | 7/2003 |
| JP | 4180425 | 6/1992 |

(Continued)

OTHER PUBLICATIONS

International Search Report for PCT/JP2005/012605 Mailed Oct. 25, 2005 w/ English Translation (4 Pages).

(Continued)

*Primary Examiner* — Christopher Brown
(74) *Attorney, Agent, or Firm* — Martin E. Hsia

(57) ABSTRACT

The present invention provides a technique for improving the security of access to contents.
A virus/phishing site list contains a list of URLs of phishing sites, which masquerade as valid websites and are provided with an attempt to acquire private information including card numbers, PIN numbers and passwords, from users illegally. When a communication control unit receives, via a network, a packet that contains communication data for requesting access to a content, a search circuit compares the URL of the content to be accessed included in the communication data, with URLs of phishing sites included in the virus/phishing site list. If the address of the content to be accessed matches a URL of a phishing site, a process execution circuit will prohibit the access to the content.

15 Claims, 18 Drawing Sheets

FOREIGN PATENT DOCUMENTS

| | | |
|---|---|---|
| JP | 11-232279 | 8/1999 |
| JP | 2001168911 | 6/2001 |
| JP | 2001-282797 | 10/2001 |
| JP | 2002-023971 | 1/2002 |
| JP | 2002-366531 | 12/2002 |
| JP | 2003169044 | 6/2003 |
| JP | 2004140618 | 5/2004 |
| JP | 2004164435 | 6/2004 |
| JP | 2004172917 | 6/2004 |
| JP | 2004187201 | 7/2004 |
| JP | 2004-295252 | 10/2004 |
| JP | 2005018942 | 1/2005 |
| KR | 2003-0019055 | 3/2003 |
| WO | 02/082750 A1 | 10/2002 |

OTHER PUBLICATIONS

International Preliminary Report on Patentability (Chapter I of the Patent Cooperation Treaty) for International Application No. PCT/JP2005/012605, Dated Aug. 21, 2007 w/ English Translation Thereof (8 Pages).

Japanese Office Action for Japanese Application No. 2007-503569, Mailed on Mar. 20, 2007 w/ English Translation Thereof (4 Pages).

Japanese Office Action for Japanese Application No. 2007-503569, mailes on Oct. 16, 2007 (4 Pages).

Office Action in Japanese Patent Application No. 2007-503659, With English Translation, Mailed Jan. 29, 2008 (6 Pages).

Patent Abstracts of Japan, Publication No. 2005-018942, Publication Date Jan. 20, 2005, (1 Page).

Patent Abstracts of Japan, Publication No. 2004-164435, Publication Date Apr. 10, 2004, (1 Page).

Patent Abstracts of Japan, Publication No. 2003-169044, Publication Date Jun. 13, 2003m (1 Page).

Patent Abstracts of Japan for Japanese Publication No. 2001-282797, Publication date Oct. 12, 2001 (1page).

International Search Report for International Application No. PCT/JP2005/015480, mailed on Dec. 6, 2005 (4 pages).

"Earthlink, Fishing Sagi Boshi Tool Teikyo e", ITmedia Enterpirse News, [online], 2004/04/1415:48 Koshin, ITmedia, [retrieval date Nov. 21, 2005], Internet <URL : htttp://www.itmedia.co.jp/enterpirse/0404/14/epi03.html> (6 pages).

"Bei-Earthlink, Fusei Web Site o Keikoku suru 'Scam Blocker' Kino o Musho toolbar de Teikyo", ITPro, [online], Oct. 1, 2004, Nikkei Business Publications, Inc., [retrieval date Nov. 21, 2005], Internet <URL : http://itpro.nikkeibp.co.jp/free/ITPro/USNEWS/20040930/150625/?ST=itpro_Print> (2 pages).

Patent Abstracts of Japan for Japanese Publication No. 2002-366531, Publication date Dec. 20, 2002 (1 page).

Notification of Transmittal of Copies of the Translation of the International Preliminary Report on Patentability (Chapter I or Chapter II of the Patent Cooperation Treaty) for International Application No. PCT/JP2005/015480, mailed on Aug. 30, 2007 (9 pages).

Notification of Reason(s) for Refusal for Japanese Application No. 2007-503571, mailed on May 29, 2007 (6 pages).

Deborah Radcliffe, "Online Fraud Shocked the U.S. Has landed in Japan. Provide against Phishing! It is No Longer the Fire on the Other Side of the River! The National Police Agency is Promoting Awareness!!," NetworkWorld, (Japan: IDG Japan, Nov. 1, 2004), vol. 9, No. 11, p. 78-87, with partial English translation (12 pages).

Shin-ichi Sudo, News & Views in Asahi Personal Computing, (Japan: Asahi Shimbun Company, Sep. 15, 2002), No. 318, p. 16-17, with partial English translation (7 pages).

Decision of Refusal for Japanese Application No. 2007-503571, mailed on Sep. 4, 2007 (4 pages).

"Protect Yourself from Danger on the Net! Hidden Tricks for Security" in click, (Japan: Nikkei Business Publications, Inc., Jul. 8, 2004) vol. 11, No. 7, p. 76-77, with partial English translation (5 pages).

Related URL: http:www.ueda.ne.jp/i-filter/func.htm (customization of block screens (5 pages).

Patent Abstracts of Japan for Japanese Publication No. 11-232279, Publication date Aug. 27, 1999 (1 page).

Japanese Office Action for Japanese Application No. 2007-106290, mailed on Jun. 17, 2008 (7 pages).

Korean Office Action for Korean Application No. Oct. 2007-7008755, mailed on Jul. 29, 2008 (8 pages).

Chinese Office Action for Chinese Application No. 200580049325.8, mailed on Feb. 27, 2009 (12 pages).

Patent Abstracts of China for Chinese Publication No. 1430753, Publication date Jul. 16, 2003 (1 page).

Korean Office Action for Korean Application No. 10-2007-7021091, mailed on Mar. 25, 2009 (7 pages).

Korean Patent Abstract for Korean Publication No. 1020030019055, Publication date Mar. 6, 2003 (1 page).

Tally et al.; Anti-Phishing: Best Practices for Institutions and Consumers, McAfee Research, Sep. 2004 (Source: http://www.mcafee.com/us/local_content/white_papers/public/wp_anti_phishing.pdf) (28 pages).

Office action mailed on Dec. 28, 2010 for U.S. Appl. No. 11/7/93,565 with a Notice of References Cited (13 pages).

* cited by examiner

| CATEGORY NO. | URL | TITLE |
|---|---|---|
| 0 | http://www.xxx.xxx/x5.html | X X X |
| 0 | http://www.xx.xx/ | X X X |
| ⋮ | ⋮ | ⋮ |

161

(b)

| CATEGORY NO. | URL | TITLE |
|---|---|---|
| 1 | http://www.xxx.com/xxx.html | RANKING |
| 1 | http://www.x.co.jp/ | QUESTIONNAIRE |
| ⋮ | ⋮ | ⋮ |

162

(c)

| CATEGORY NO. | URL | TITLE |
|---|---|---|
| 3 | http://www.xxx.com/x/1.html | CRIME |
| 4 | http://www.xxx.com/x/2.html | CRIME |
| ⋮ | ⋮ | ⋮ |

| CATEGORY NO. | URL | TITLE |
|---|---|---|
| 1 | http://www.xxx/x.html | TRAVEL |
| 1 | http://www.xxx/a.html | TICKETS |
| ⋮ | ⋮ | ⋮ |
| 1 | http://www.xxx.xxx/1.html | HOT SPRING |
| 2 | http://www.xxx.com/ | MOVIES |
| 2 | http://www.x.co.jp/r.html | RECOMMENDED |
| ⋮ | ⋮ | ⋮ |
| 2 | http://www.x.co.jp/1/x/ | REVIEW |
| 3 | http://www.xxx.com/x/1.html | CRIME |
| 3 | http://www.xxx/x/1.html | VIOLENCE |
| ⋮ | ⋮ | ⋮ |

(a) VIRUS/PHISHING SITE LIST | MATCHED (62) | PROHIBIT (64) |

(b) WHITELIST | MATCHED (62) | PERMIT (64) |

(c) BLACKLIST | MATCHED (62) | PROHIBIT (64) |

(d) COMMON CATEGORY LIST

| USER ID (168) | CATEGORY (169) |||||||
|---|---|---|---|---|---|---|---|
| | 1 | 2 | 3 | 4 | 5 | ...... | 57 |
| 000001 | ○ | × | × | ○ | ○ | ...... | × |
| 000002 | ○ | ○ | × | × | ○ | ...... | ○ |
| 000003 | ○ | ○ | × | ○ | × | ...... | ○ |
| ⋮ | ⋮ | ⋮ | ⋮ | ⋮ | ⋮ | ⋮ | ⋮ |

60

COMMUNICATION CONTROL DEVICE AND COMMUNICATION CONTROL SYSTEM

TECHNICAL FIELD

The present invention relates to a communication control technique, particularly to a communication control apparatus and a communication control system for preventing access to illegal or inappropriate web pages.

BACKGROUND ART

Due to improved Internet infrastructures and the widespread of communication terminals, such as cellular phone terminals, personal computers, and VoIP (Voice over Internet Protocol) phone sets, the number of Internet users is now exploding. Under such circumstances, security problems such as computer viruses, hacking and spam mails have become apparent, requiring appropriate techniques for communication control.

The Internet has enabled easy access to a vast amount of information. On the other hand, harmful information is proliferating thereon and regulation on its originator does not keep up with the proliferation. To provide an environment where everyone can use the Internet safely and effectively, there is required an appropriate technique for controlling access to harmful contents.

For example, there has been proposed an access control technique in which are prepared databases containing lists of sites to which access is permitted or prohibited, forbidden keywords or useful keywords, so as to control access to external information via the Internet with reference to such databases (see Patent Document 1, for example).

[Patent Document 1] Japanese Patent Application Laid-open No. 2001-282797.

DISCLOSURE OF INVENTION

Problem to be Solved by the Invention

Besides access control for harmful contents, measures against phishing fraud have been also required in recent years. Phishing is a fraud that sends to users e-mails containing links to "trap sites", which masquerade as the sites of real banks or credit card companies, or shopping sites. The fraudster attempts to direct users to such "trap site" via the link and prompt them to enter their credit card numbers or passwords thereon, so as to acquire such information illegally. The victims of phishing have rapidly increased recently, but countermeasures thereto are not considered sufficient.

If a user receives an e-mail containing a file with a virus or spyware embedded therein, or receives an HTML e-mail containing code to attack the vulnerability, antivirus software may detect and remove the virus as long as such software has been installed in user's terminal. However, used in phishing is a simple e-mail disguised as a normal one, so that antivirus software is unable to detect or remove the mail. Moreover, since many e-mails used for phishing present fake names or addresses in the sender fields (From), users, particularly those with little experience, may believe the names of real banks written in the sender fields and may be vulnerable to the traps.

A website that such link points to is also a simple web page and contains no "malicious attack code" that antivirus software can detect. There have been increasing cases using clever tricks, such as where a particular format for URLs is used to mislead a user into believing that the link points to a real domain name, or where the address bar in a pop-up window is hidden, causing an increasing number of "fished" victims. Further, more subtle tactics have been devised, such as faking the address bar using JavaScript (registered trademark), so that announcement or warning to users does not suffice to prevent the increasing damage caused by phishing.

There is an urgent need to develop a reliable technique for preventing access to phishing sites, without depending on users' awareness.

The present invention has been made in view of such situation, and a general purpose thereof is to provide a technique for improving the security of access to contents.

Means for Solving the Problem

One aspect of the present invention relates to a communication control apparatus. The communication control apparatus comprises: a maintaining unit which maintains a list of addresses of illegal web pages provided with an attempt to acquire information illegally; a receiving unit which receives, via a network, communication data for requesting access to a content; a comparison unit which compares the address of the content included in the communication data, with an address of an illegal web page included in the list; and an access control unit which prohibits access to the content when the address of the content matches the address of the illegal web page.

The illegal web page may be a web page in a phishing site which masquerades as a valid website and comprises an interface for prompting a user to enter information.

Another aspect of the present invention relates to a communication control system. The communication control system comprises the communication control apparatus described above and a list registration unit which accepts the address of the illegal web page and registers the address in the list.

The communication control system may further comprise a charging unit which manages charging information. The list registration unit may request the charging unit to pay a fee to a registrant upon acceptance of the address of the illegal web page, and the charging unit may perform processing for paying the fee to the registrant.

The communication control system may further comprise a message output unit which, when the access control unit prohibits access to the content, transmits a predetermined message to the source of the access request, instead of data of the content.

The list registration unit may further accept a message to be transmitted, upon reception of a request for access to the illegal web page, to the source of the access request, when said unit accepts the address of the web page. Also, the message output unit may transmit the message instead of data of the illegal web page, upon reception of a request for access to the web page. The message may be provided by a third party with charge or free of charge, or may be registered in advance by the source of the access request. Also, a different message may be transmitted to each source of access request. The message may contain a link to a valid website. The list registration unit may request a charging unit, which manages charging information, to charge a fee to a registrant upon acceptance of the message. The charging unit may then perform processing for charging the fee to the registrant.

Yet another aspect of the present invention also relates to a communication control system. The communication control system comprises: the communication control apparatus described above; a use request acceptance unit which accepts from a user a request for a use of a service provided by the communication control apparatus, in which access to the illegal web page is controlled; and a charging unit which manages charging information, wherein: the use request acceptance unit requests the charging unit to charge a fee to a user upon accepting from the user a request for a use of the service; and the charging unit performs processing for charging the fee to the user.

Still yet another aspect of the present invention relates to a communication control apparatus. The communication control system comprises: a search request acceptance unit which accepts a search request for a web page; a search unit which searches for a web page that matches a search request accepted by the search request acceptance unit; a search result presentation unit which presents a search result of the search unit; and the communication control apparatus described above, wherein the communication control apparatus prohibits, upon accepting a request for access to a web page included in the search result presented by the search result presentation unit, access to the web page when the web page is an illegal web page.

A further aspect of the present invention also relates to a communication control apparatus. The communication control system comprises: a search request acceptance unit which accepts a search request for a web page; a search unit which searches for a web page that matches a search request accepted by the search request acceptance unit; a maintaining unit which maintains a list of addresses of illegal web pages provided with an attempt to acquire information illegally; a comparison unit which compares an address of a web page included in the search result of the search unit, with an address of an illegal web page included in the list; and a search result presentation unit which only presents a web page that is not the illegal web page, in the search result of the search unit.

Optional combinations of the aforementioned constituting elements, and implementations of the invention in the form of methods, apparatuses, systems, recording mediums and computer programs may also be practiced as additional modes of the present invention.

Advantageous Effects

The present invention provides a technique for improving the security of access to contents.

BRIEF DESCRIPTION OF THE DRAWINGS

FIG. 14A is a diagram that shows an example of internal data of a virus/phishing site list; FIG. 14B is a diagram that shows an example of internal data of a whitelist; and FIG. 14C is a diagram that shows an example of internal data of a blacklist.

FIG. 15 is a diagram that shows an example of internal data of a common category list.

FIGS. 16A, 16B, 16C and 16D are diagrams that show examples of internal data of the second database.

Figure 1:
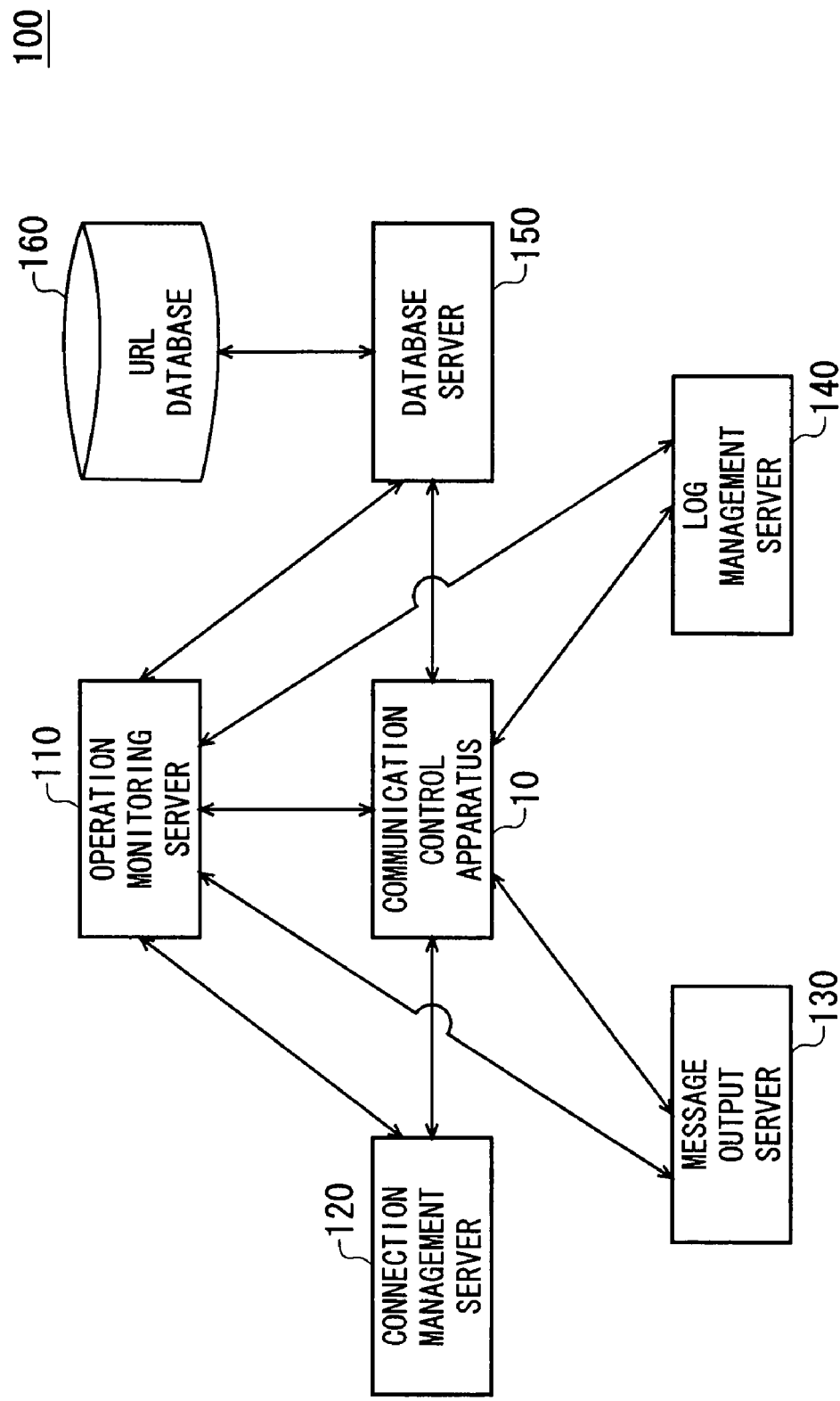
FIG. 1 is a diagram that shows a configuration of a communication control system according to a base technology.

EXPLANATION OF REFERENCE NUMERALS 10 communication control apparatus
12 communication control unit
14 switch control unit
20 packet processing circuit
30 search circuit
32 position detection circuit
33 comparison circuit
34 index circuit
35 comparison circuit
36 binary search circuit
40 process execution circuit
50 first database
57 user database
60 second database
100 communication control system
110 operation monitoring server
111 management table
120 connection management server
130 message output server
140 log management server
150 database server
160 URL database
161 virus/phishing site list
162 whitelist
163 blacklist
164 common category list
170 charging server
180 registration acceptance server
210 site operator terminal
220 virus/phishing site list providing server
230 user terminal
300 search site
310 communication unit
320 search request acceptance unit
330 search unit
340 search result presentation unit

BEST MODE FOR CARRYING OUT THE INVENTION (Base Technology)
First, as a base technology, a communication control apparatus will be described as an illustrative data processing apparatus, and the configuration of its peripheral apparatuses and the outline of the operation will be also explained. Thereafter, there will be described a URL filtering technique using the communication control apparatus before a technique for operating multiple communication control apparatuses will be described as an embodiment.

FIG. 1 shows a configuration of a communication control system according to the base technology. A communication control system 100 comprises a communication control apparatus 10 and various peripheral apparatuses provided to support the operation of the communication control apparatus 10. The communication control apparatus 10 of the base technology performs a URL filtering function provided by an Internet service provider or the like. The communication control apparatus 10 provided on a network path acquires a request for access to a content, analyzes the content, and determines whether or not the access to the content should be permitted. If the access to the content is permitted, the communication control apparatus 10 will transmit the access request to a server that retains the content. If the access to the content is prohibited, the communication control apparatus 10 will discard the access request and return a warning message or the like to the source of the request. The communication control apparatus 10 of the base technology receives an access request, such as an HTTP (HyperText Transfer Protocol) "GET" request message. The apparatus then searches a list of reference data for determining access permission to check if the URL of the content to be accessed appears in the list, so as to determine whether or not the access to the content should be permitted.

The peripheral apparatuses include an operation monitoring server 110, a connection management server 120, a message output server 130, a log management server 140 and a database server 150. The connection management server 120 manages connection to the communication control apparatus 10. When the communication control apparatus 10 processes a packet transmitted from a cellular phone terminal, for example, the connection management server 120 authenticates the user as a user of the communication control apparatus 10, based on information included in the packet, which uniquely identifies the cellular phone terminal. Once the user is authenticated, packets transmitted from the IP address, which is temporarily provided for the cellular phone terminal, will be transmitted to the communication control apparatus 10 and processed therein, without being authenticated by the connection management server 120 during a certain period. The message output server 130 outputs a message to the destination or the source of an access request, according to whether the communication control apparatus 10 has permitted the access. The log management server 140 manages the operating history of the communication control apparatus 10. The database server 150 acquires the latest database from a URL database 160 and provides the database to the communication control apparatus 10. To update the database without halting the operation of the communication control apparatus 10, the apparatus may possess a backup database. The operation monitoring server 110 monitors the operating status of the communication control apparatus 10 and its peripheral apparatuses including the connection management server 120, message output server 130, log management server 140 and database server 150. The operation monitoring server 110 has the highest priority in the communication control system 100 and performs supervisory control of the communication control apparatus 10 and all the peripheral apparatuses. The communication control apparatus 10 is configured with a dedicated hardware circuit, as will be described later. By inputting to or outputting from the communication control apparatus 10 the data for monitoring by means of a boundary-scan circuit, based on the technique described in Japanese Patent No. 3041340 filed by the present applicant or other techniques, the operation monitoring server 110 can monitor the operating status even while the communication control apparatus 10 is in operation.

In the communication control system 100 of the base technology, as will be described below, the communication control apparatus 10, configured with a dedicated hardware circuit for faster operation, is controlled by using a group of peripheral servers connected thereto and having various functions. Accordingly, by suitably replacing the software of the group of servers, a wide variety of functions can be achieved with a similar configuration. Thus, the base technology provides such communication control system having high flexibility.

Figure 2:
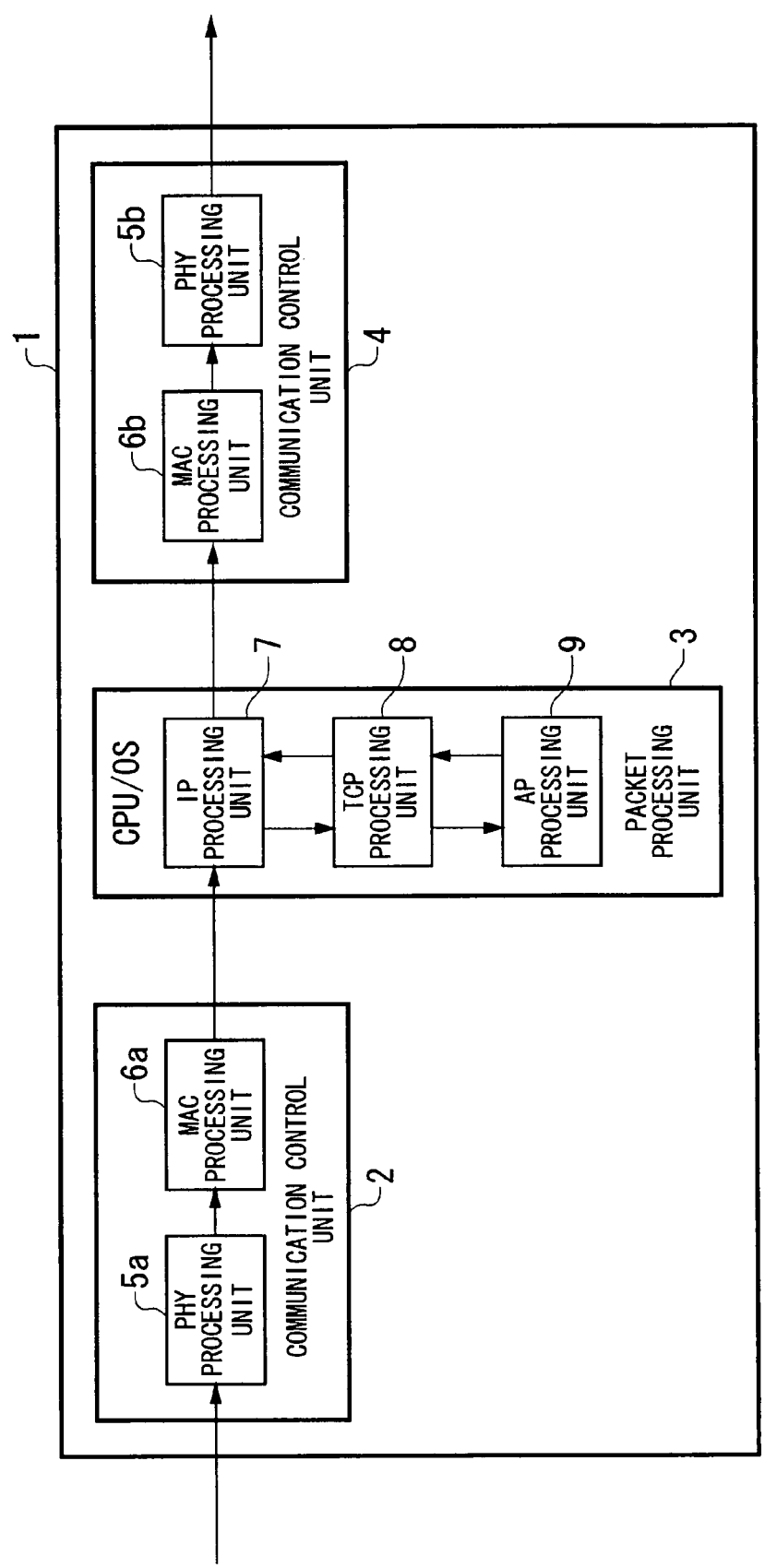
FIG. 2 is a diagram that shows a configuration of a conventional communication control apparatus.

FIG. 2 shows a configuration of a conventional communication control apparatus 1. The conventional communication control apparatus 1 comprises a communication control unit 2 on the receiving side, a packet processing unit 3, and a communication control unit 4 on the sending side. The communication control units 2 and 4 include PHY processing units 5a and 5b for performing physical layer processing of packets, and MAC processing units 6a and 6b for performing MAC layer processing of packets, respectively. The packet processing unit 3 includes protocol processing units for performing protocol-specific processing, such as an IP processing unit 7 for performing IP (Internet Protocol) processing and a TCP processing unit 8 for performing TCP (Transport Control Protocol) processing. The packet processing unit 3 also includes an AP processing unit 9 for performing application layer processing. The AP processing unit 9 performs filtering or other processing according to data included in a packet.

The packet processing unit 3 of the conventional communication control apparatus 1 is implemented by software, using a general-purpose processor, or CPU, and an OS running on the CPU. With such configuration, however, the performance of the communication control apparatus 1 depends on the performance of the CPU, hampering the creation of a communication control apparatus capable of high-speed processing of a large volume of packets. For example, a 64-bit CPU can process only up to 64 bits at a time, and hence, there has existed no communication control apparatus having a higher performance than this. In addition, since the conventional communication control apparatus is predicated on the presence of an OS with versatile functionality, the possibility of security holes cannot be eliminated completely, requiring maintenance work including OS upgrades.

Figure 3:
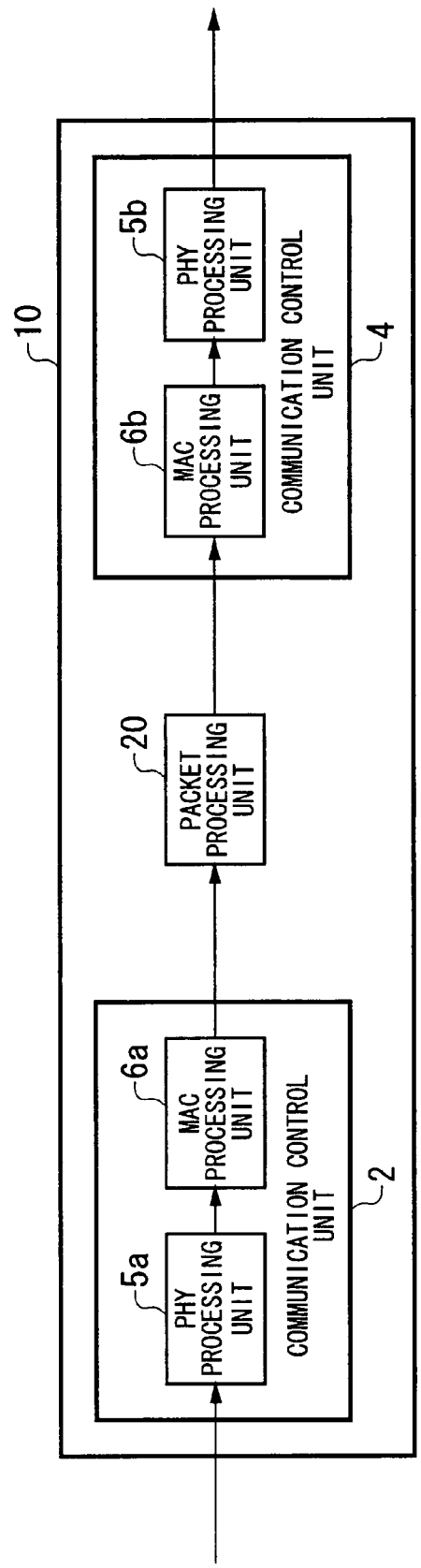
FIG. 3 is a diagram that shows a configuration of a communication control apparatus according to the base technology.

FIG. 3 shows a configuration of a communication control apparatus in the base technology. The communication control apparatus 10 comprises a packet processing circuit 20 configured with dedicated hardware employing a wired logic circuit, instead of the packet processing unit 3 implemented by software including a CPU and an OS in the conventional communication control apparatus 1 shown in FIG. 2. By providing a dedicated hardware circuit to process communication data, rather than processing it with an OS and software running on a general-purpose processing circuit such as CPU, the performance limitations posed by the CPU or OS can be overcome, enabling a communication control apparatus having high throughput.

For example, a case will be considered here in which, in packet filtering or the like, a search is conducted to check if the data in a packet includes reference data, which serves as criteria for filtering. When a CPU is used to compare the communication data with the reference data, there occurs a problem in that, since only 64-bit data can be compared at a time, the processing speed cannot be improved beyond such CPU performance. Since the CPU needs to repeat the process of loading 64 bits of communication data into a memory and comparing it with the reference data, the memory load time becomes a bottleneck which limits the processing speed.

In the base technology, by contrast, a dedicated hardware circuit configured with a wired logic circuit is provided to compare communication data with reference data. This circuit includes multiple comparators arranged in parallel, so as to enable the comparison of data having a length greater than 64 bits, such as 1024 bits. By providing dedicated hardware in such manner, bit matching can be simultaneously performed on a large number of bits in parallel. Since 1024-bit data can be processed at a time, while the conventional communication control apparatus 1 using a CPU processes only 64 bits, the processing speed can be improved remarkably. Increasing the number of comparators will improve the throughput, but also increase the cost and size of the apparatus. Accordingly, an optimal hardware circuit may be designed in accordance with the desired performance, cost or size. The dedicated hardware circuit may be configured using FPGA (Field Programmable Gate Array), etc.

Since the communication control apparatus 10 of the base technology is configured with dedicated hardware employing a wired logic circuit, it does not require any OS (Operating System). This can eliminate the need for the installation, bug fixes, or version upgrades of an OS, thereby reducing the cost and man-hours required for administration and maintenance. Also, unlike CPUs requiring versatile functionality, the communication control apparatus 10 does not include any unnecessary functions or use needless resources, and hence, reduced cost, a smaller circuit area or improved processing speed can be expected. Furthermore, again unlike conventional OS-based communication control apparatuses, the absence of unnecessary functions decreases the possibility of security holes and thus enhances the tolerance against attacks from malicious third parties over a network.

The conventional communication control apparatus 1 processes packets using software predicated on a CPU and an OS. Therefore, all packet data needs to be received before protocol processing is performed, and then the data is passed to an application. In contrast, since packet processing is performed by a dedicated hardware circuit in the communication control apparatus 10 of the base technology, all packet data needs not be received before starting the processing. Upon reception of necessary data, the processing can be started at any given point in time without waiting for the reception of subsequent data. For example, position detection processing in a position detection circuit, which will be described later, may be started at the time when position identification data for identifying the position of comparison target data is received. Thus, various types of processing can be performed in parallel without waiting for the reception of all data, reducing the time required to process packet data.

Figure 4:
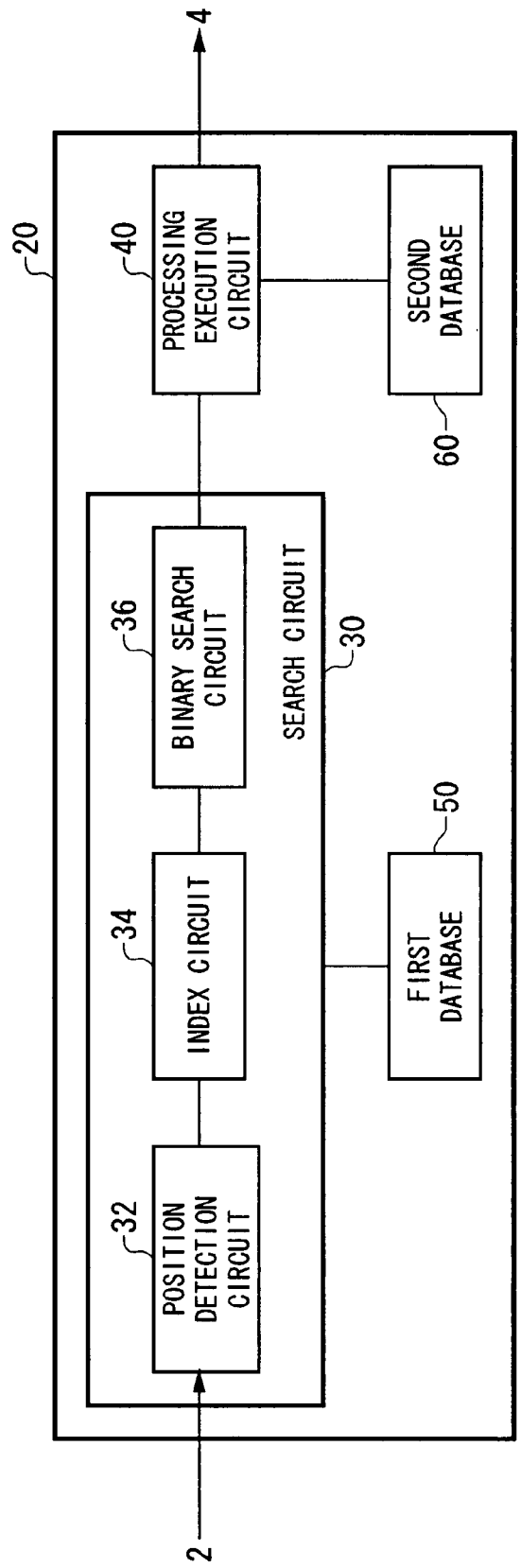
FIG. 4 is a diagram that shows an internal configuration of a packet processing circuit.

FIG. 4 shows an internal configuration of the packet processing circuit. The packet processing circuit 20 comprises: a first database 50 for storing reference data to be referred to when determining processing to be performed on communication data; a search circuit 30 for searching received communication data for the reference data by comparing the two; a second database 60 for storing a search result of the search circuit 30 and a content of processing to be performed on the communication data, which are related to each other; and a process execution circuit 40 for processing the communication data based on the search result of the search circuit 30 and the conditions stored in the second database 60.

The search circuit 30 includes: a position detection circuit 32 for detecting the position of comparison target data, which is to be compared with reference data, in communication data; an index circuit 34 which serves as an example of a determination circuit for determining which range the comparison target data belongs to, among three or more ranges into which the reference data stored in the first database 50 is divided; and a binary search circuit 36 for searching the determined range for the reference data that matches the comparison target data. The reference data may be searched for the comparison target data using any search technique, and a binary search method is used in the base technology.

Figure 5:
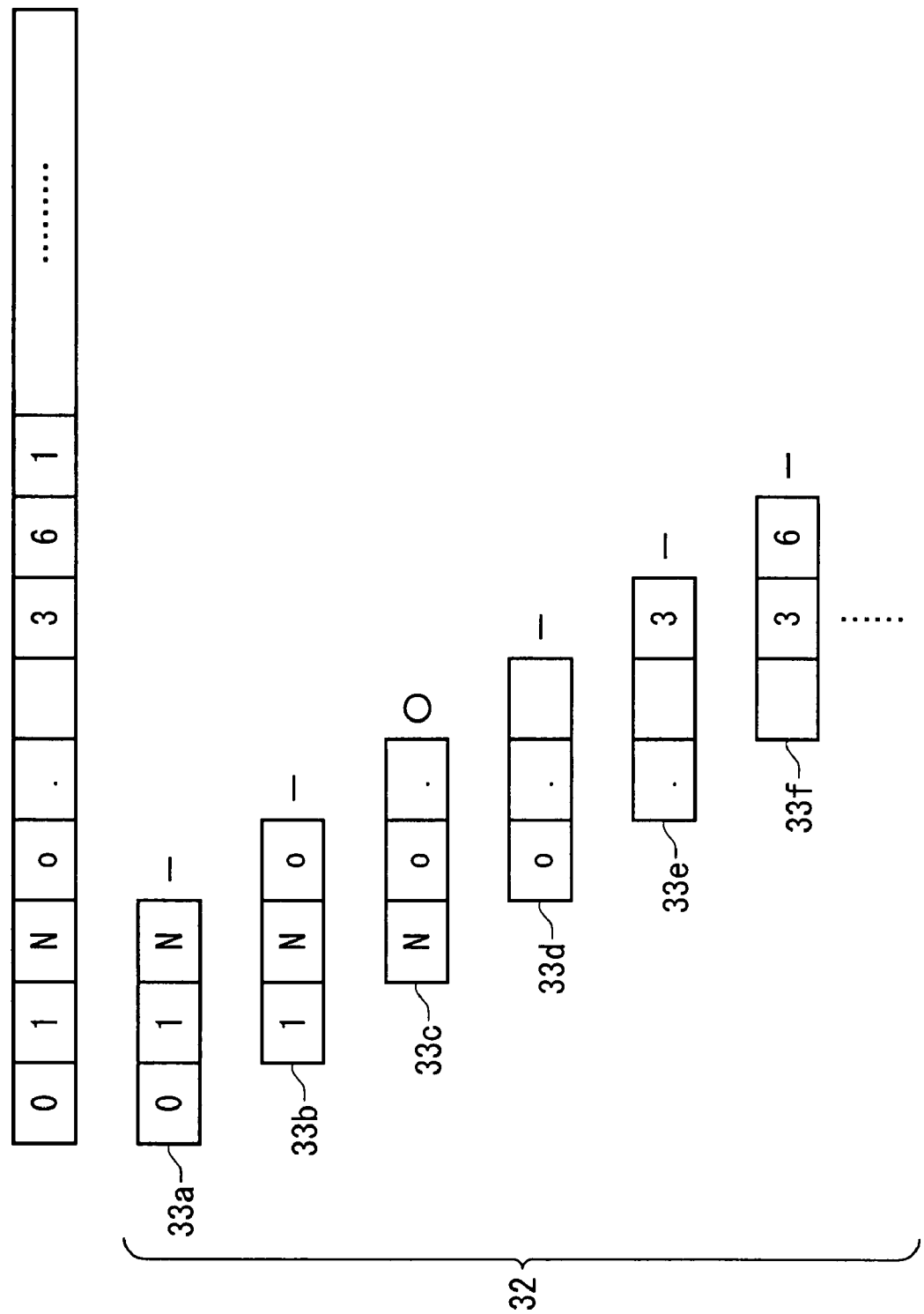
FIG. 5 is a diagram that shows an internal configuration of a position detection circuit.

FIG. 5 shows an internal configuration of the position detection circuit. The position detection circuit 32 includes multiple comparison circuits 33a-33f which compare communication data with position identification data for identifying the position of comparison target data. While six comparison circuits 33a-33f are provided here, the number of comparison circuits may be arbitrary, as will be described later. To the comparison circuits 33a-33f are input pieces of communication data, with each piece shifted from the preceding one by a predetermined data length, such as 1 byte. These multiple comparison circuits 33a-33f then simultaneously compare the communication data with the position identification data to be detected in parallel.

The base technology will be described by way of example for explaining the operation of the communication control apparatus 10, in which a character string "No. ###" in communication data is detected, the number "###" included in the character string is then compared with reference data, and if the number matches the reference data, the packet will be allowed to pass, while, if they do not match, the packet will be discarded.

In the example of FIG. 5, communication data "01No. 361 . . . " is input to the comparison circuits 33a-33f with a shift of one character each, and position identification data "No." for identifying the position of the number "###" is sought to be detected in the communication data. More specifically, "01N" is input to the comparison circuit 33a, "1No" to the comparison circuit 33b, "No." to the comparison circuit 33c, "o. " to the comparison circuit 33d, ". 3" to the comparison circuit 33e, and "36" to the comparison circuit 33f. Then, the comparison circuits 33a-33f simultaneously perform comparisons with the position identification data "No.". Consequently, there is found a match with the comparison circuit 33c, indicating that the character string "No." exists at the third character from the top of the communication data. Thus, it is determined that the numeral data as comparison target data exists subsequent to the position identification data "No." detected by the position detection circuit 32.

When the same processing is performed by a CPU, since the comparison process needs to be serially performed one by one from the top, such as comparing character strings "01N" and "No." before comparing "1No" and "No.", no improvement of detection speed can be expected. In the communication control apparatus 10 of the base technology, in contrast, providing the multiple comparison circuits 33a-33f in parallel enables simultaneous parallel comparison processing, which could not have been performed by a CPU, improving the processing speed significantly. Providing more comparison circuits will improve the detection speed, as more characters can be compared simultaneously. In consideration of cost or size, a sufficient number of comparison circuits may be provided to achieve a desired detection speed.

Aside from detecting position identification data, the position detection circuit 32 may also be used as a circuit for detecting character strings for various purposes. Moreover, the position detection circuit 32 may be configured to detect position identification data in units of bits, not just as a character string.

Figure 6:
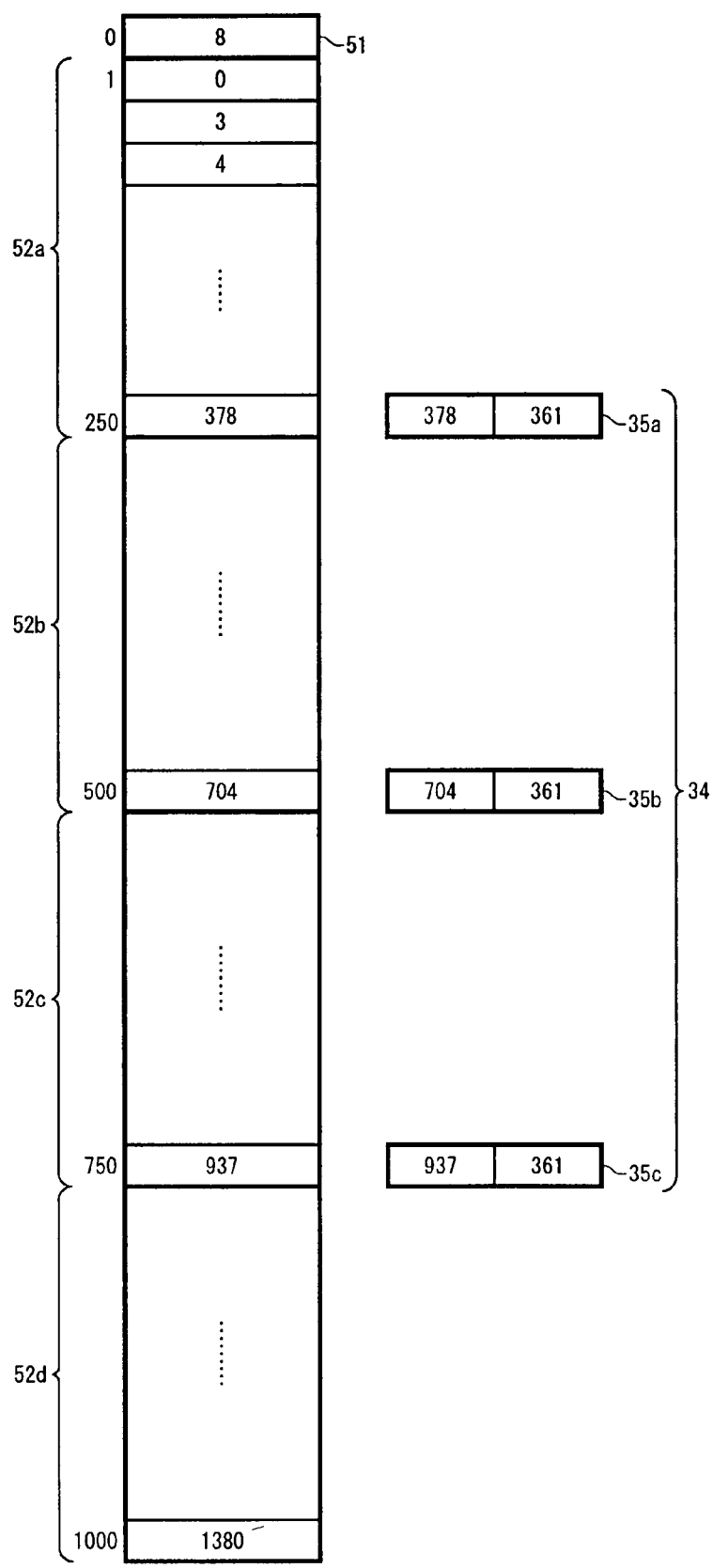
FIG. 6 is a diagram that shows an example of internal data of a first database.

FIG. 6 shows an example of internal data of the first database. The first database 50 stores reference data to be referred to when determining the processing on packets, such as filtering, routing, switching, and replacement. The pieces of reference data are sorted according to some sort conditions. In the example of FIG. 6, 1000 pieces of reference data are stored.

The top record of the first database 50 contains an offset 51 which indicates the position of comparison target data in communication data. For example, in a TCP packet, the data configuration within the packet is determined in units of bits. Therefore, if the position of flag information or the like for determining the processing on the packet is given in the form of the offset 51, the processing can be determined by comparing only necessary bits, thus improving the processing efficiency. Also, even when the configuration of packet data is changed, it can be settled by modifying the offset 51 accordingly. The first database 50 may store the data length of comparison target data. In this case, since the comparison can be performed by operating only a required number of comparators, the search efficiency can be improved.

The index circuit 34 determines which range the comparison target data belongs to, among three or more ranges, such as 52a-52d, into which reference data stored in the first database 50 is divided. In the example of FIG. 6, the 1000 pieces of reference data are divided into four ranges 52a-52d, i.e., 250 pieces each. The index circuit 34 includes multiple comparison circuits 35a-35c, each of which compares a piece of reference data at the border of the range with the comparison target data. Since the comparison circuits 35a-35c simultaneously compare the pieces of reference data at the borders with the comparison target data in parallel, which range the comparison target data belongs to can be determined by a single operation of comparison processing.

The pieces of reference data at the borders to be input to the comparison circuits 35a-35c of the index circuit 34 may be set by an apparatus provided outside the communication control apparatus 10. Alternatively, reference data at predetermined positions in the first database 50 may be set in advance to be input automatically as such. In the latter case, even when the first database 50 is updated, the reference data at the predetermined positions in the first database 50 are automatically input to the comparison circuits 35a-35c. Therefore, the communication control processing can be performed immediately without initialization or the like.

As mentioned previously, CPU-based binary search cannot make multiple comparisons at the same time. In the communication control apparatus 10 of the base technology, in contrast, providing the multiple comparison circuits 35a-35c in parallel enables simultaneous parallel comparison processing, with a significant improvement in the search speed.

After the index circuit 34 determines the relevant range, the binary search circuit 36 performs a search using a binary search method. The binary search circuit 36 divides the range determined by the index circuit 34 further into two and subsequently compares the piece of reference data lying at the border with the comparison target data, thereby determining which range the comparison target data belongs to. The binary search circuit 36 includes multiple comparison circuits for comparing, bit by bit, reference data with comparison target data. For example, in the base technology are provided 1024 comparison circuits to perform bit matching on 1024 bits simultaneously. When the range to which the comparison target data belongs is determined between the two split ranges, the determined range is further divided into two. Then, the reference data lying at the border is read out to be compared with the comparison target data. Thereafter, this processing is repeated to narrow the range further until reference data that matches the comparison target data is eventually found.

The operation will now be described in more detail in conjunction with the foregoing example. In the communication data shown in FIG. 5, the number "361" is the comparison target data that follows the position identification data "No.". Since a single space character intervenes between the position identification data "No." and the comparison target data "361", the offset 51 is set to "8" bits in order to exclude the space from the comparison target data. Accordingly, the binary search circuit 36 skips the first "8" bits, or 1 byte, of the communication data subsequent to the position identification data "No." and reads the following "361" as the comparison target data.

Each of the comparison circuits 35a-35c of the index circuit 34 receives "361" as comparison target data. As for reference data, the comparison circuit 35a receives "378", which lies at the border of the ranges 52a and 52b. Similarly, the comparison circuit 35b receives reference data "704" lying at the border of the ranges 52b and 52c, and the comparison circuit 35c receives reference data "937" lying at the border of the ranges 52c and 52d. The comparison circuits 35a-35c then perform comparisons simultaneously, determining that the comparison target data "361" belongs to the range 52a. Subsequently, the binary search circuit 36 searches the reference data for the comparison target data "361".

Figure 7:
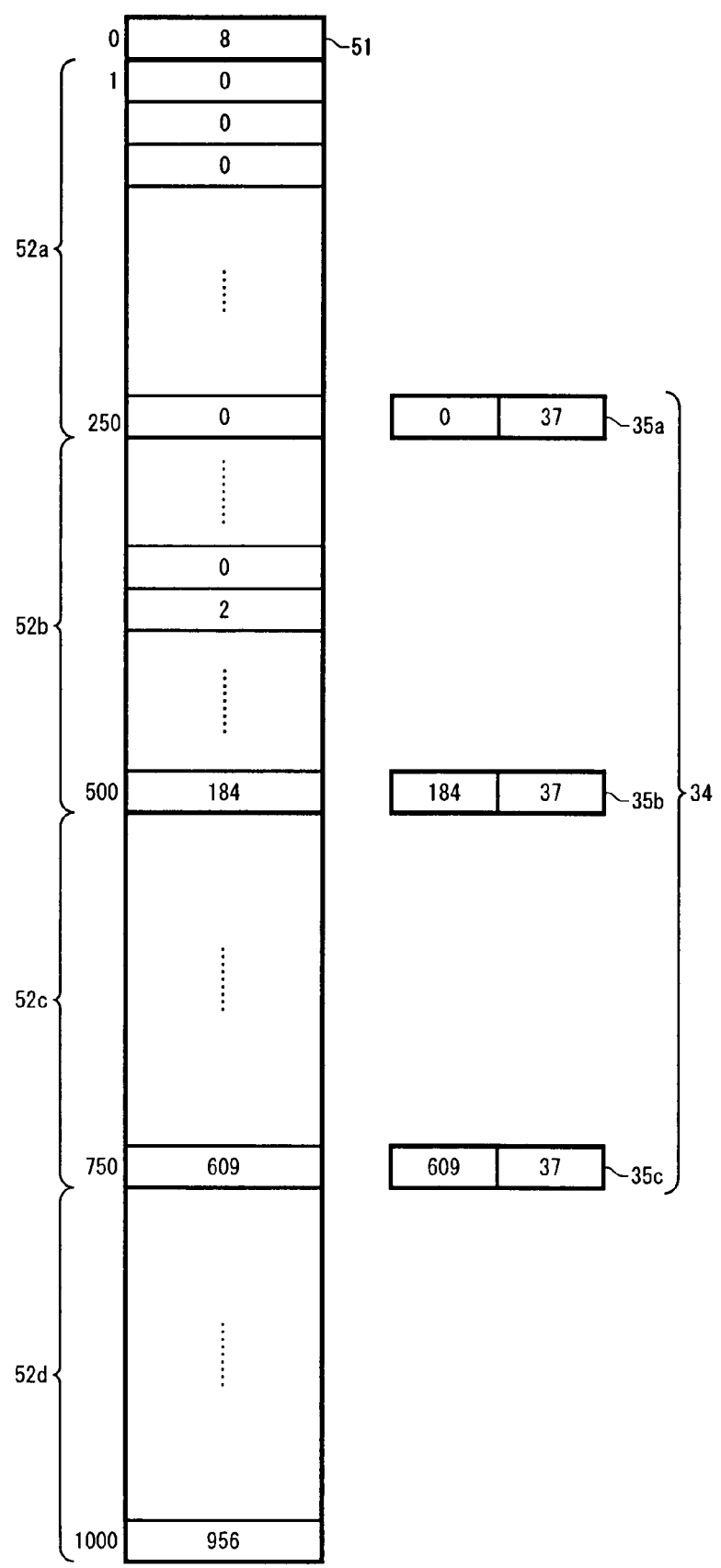
FIG. 7 is a diagram that shows another example of internal data of the first database.

FIG. 7 shows another example of internal data of the first database. In the example shown in FIG. 7, the number of pieces of reference data is smaller than the number of pieces of data storable in the first database 50, i.e., 1000 in this case. In such instance, the first database 50 stores the pieces of reference data in descending order, starting with the last data position therein. Then, 0 is stored in the rest of the data positions. The database is loaded with data not from the top but from the bottom of the loading area, and all the vacancies occurring in the front of the loading area, if any, are replaced with zero. Consequently, the database is fully loaded at any time, so that the maximum time necessary for a binary search will be constant. Moreover, if the binary search circuit 36 reads reference data "0" during a search, the circuit can identify the range without making a comparison, as the comparison result is obvious, and can proceed to the next comparison. Consequently, the search speed can be improved.

In CPU-based software processing, the first database 50 stores pieces of reference data in ascending order, from the first data position therein. In the rest of data positions will be stored a maximum value or the like, and in such case, the skip of comparison processing as described above cannot be made during a binary search. The comparison technique described above can be implemented by configuring the search circuit 30 with a dedicated hardware circuit.

Figure 8:
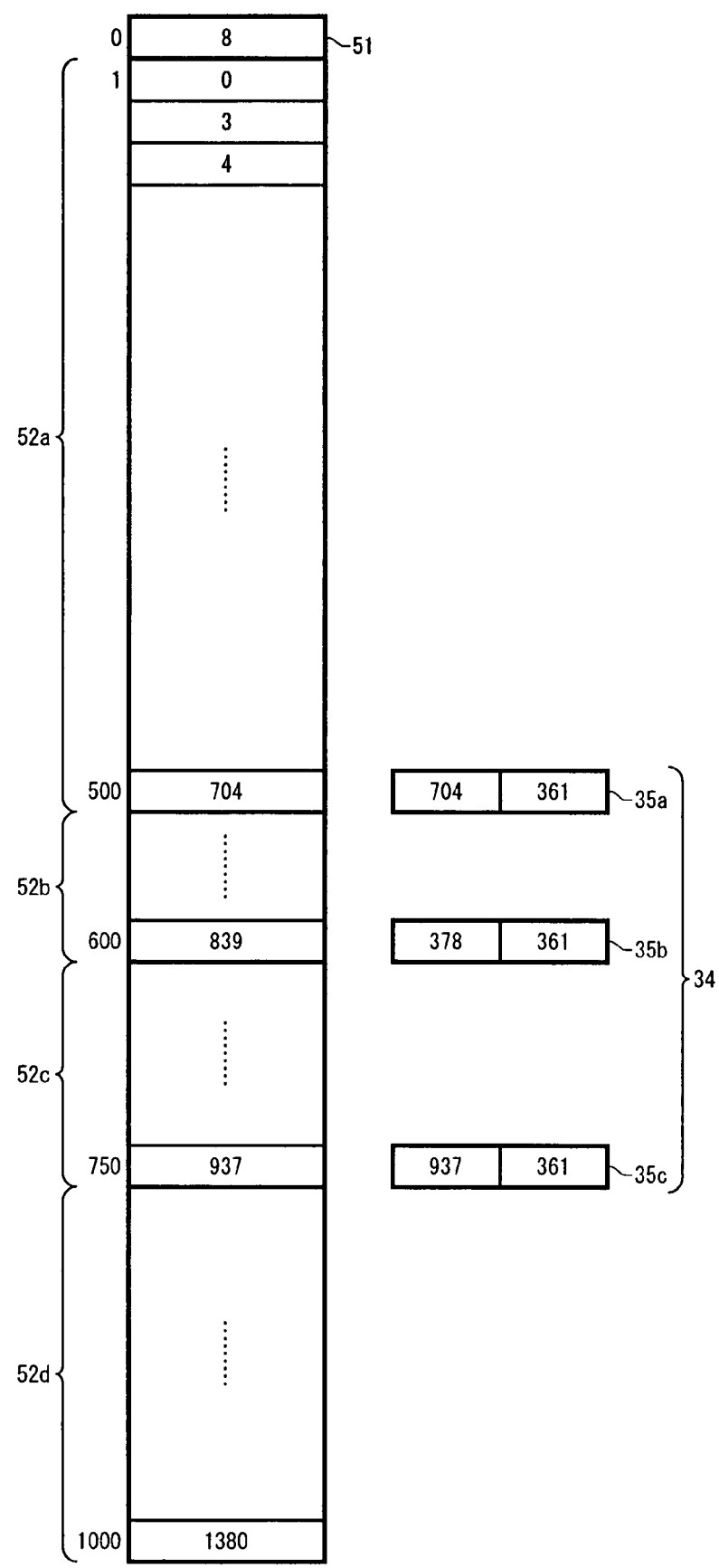
FIG. 8 is a diagram that shows yet another example of internal data of the first database.

FIG. 8 shows yet another example of internal data of the first database. In the example shown in FIG. 8, the reference data is not evenly divided into three or more ranges, but unevenly divided into ranges that accommodate different numbers of pieces of data, such as 500 pieces in the range 52a and 100 pieces in the range 52b. These ranges may be determined depending on the distribution of frequencies with which reference data occurs in communication data. Specifically, the ranges may be determined so that the sums of the frequencies of occurrence of reference data belonging to the respective ranges are almost the same. Accordingly, the search efficiency can be improved. The reference data to be input to the comparison circuits 35a-35c of the index circuit 34 may be modifiable from the outside. In such case, the ranges can be dynamically set, so that the search efficiency will be optimized.

Figure 9:
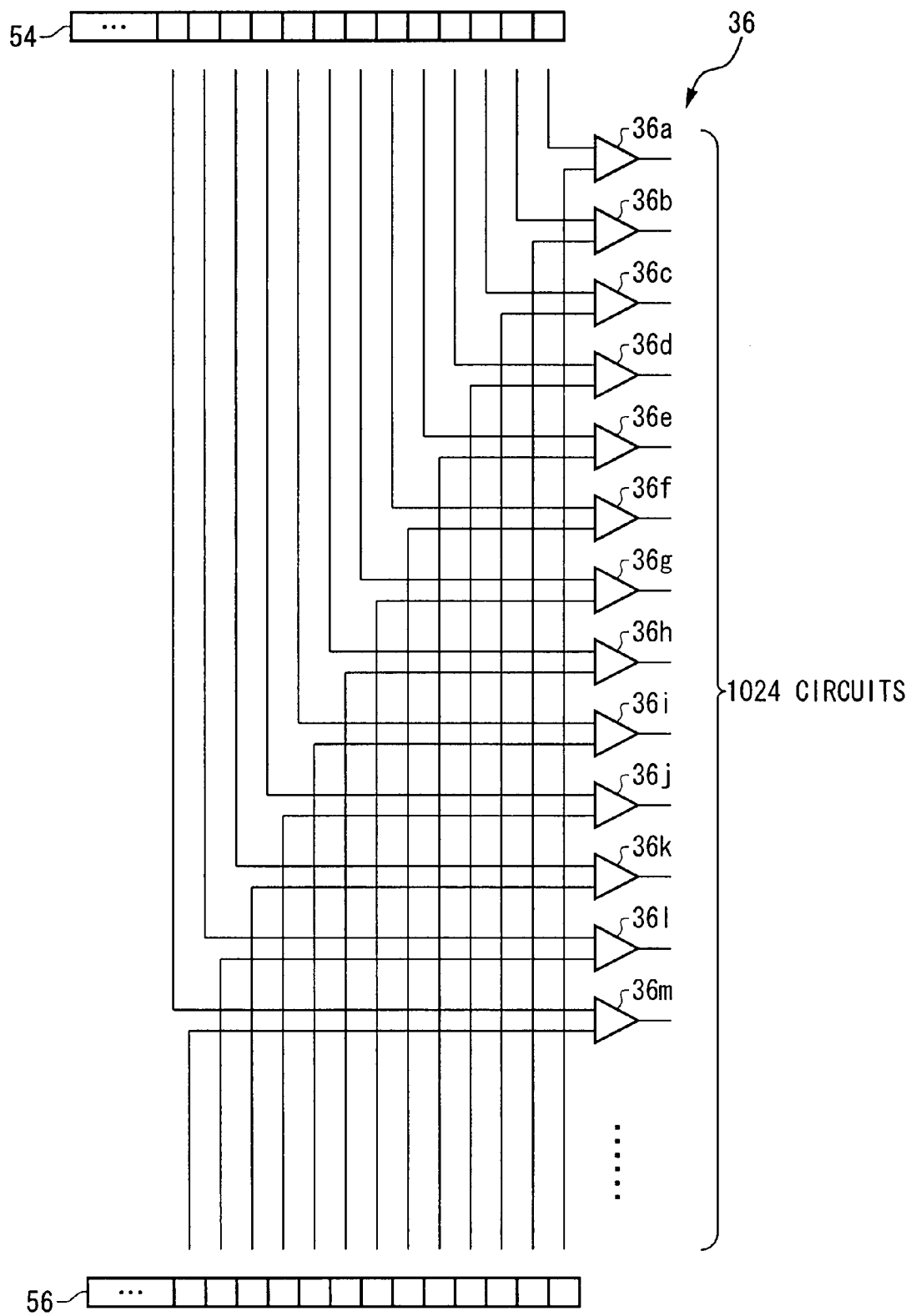
FIG. 9 is a diagram that shows a configuration of comparison circuits included in a binary search circuit.

FIG. 9 shows a configuration of comparison circuits included in the binary search circuit. As mentioned previously, the binary search circuit 36 includes 1024 comparison circuits, such as 36a, 36b, . . . . Each of the comparison circuits 36a, 36b, etc. receives 1 bit of reference data 54 and 1 bit of comparison target data 56 to compare the bits in value. The comparison circuits 35a-35c of the index circuit 34 have similar internal configurations. Since the comparison processing is thus performed by a dedicated hardware circuit, a large number of comparison circuits can be operated in parallel to compare a large number of bits at a time, thereby speeding up the comparison processing.

Figure 10:
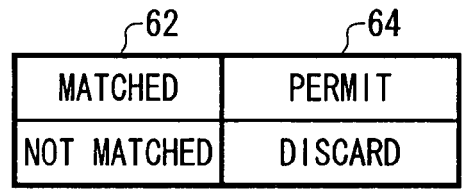
FIG. 10 is a diagram that shows an example of internal data of a second database.

FIG. 10 shows an example of internal data of the second database. The second database 60 includes a search result field 62, which contains a search result of the search circuit 30, and a processing content field 64, which contains a processing content to be performed on communication data. The database stores the search results and the processing contents related to each other. In the example of FIG. 10, conditions are established such that a packet will be allowed to pass if its communication data contains reference data; if not, the packet will be discarded. The process execution circuit 40 searches the second database 60 for a processing content based on the search result and performs the processing on the communication data. The process execution circuit 40 may also be configured with a wired logic circuit.

Figure 11:
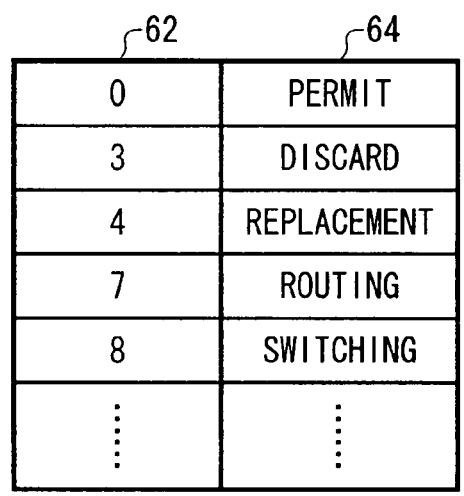
FIG. 11 is a diagram that shows another example of internal data of the second database.

FIG. 11 shows another example of internal data of the second database. In the example of FIG. 11, the processing content is set for each piece of reference data. With regard to packet replacement, replacement data may be stored in the second database 60. As for packet routing or switching, information on the route may be stored in the second database 60. The process execution circuit 40 performs processing, such as filtering, routing, switching, or replacement, which is specified in the second database 60, in accordance with the search result of the search circuit 30. When the processing content is set for each piece of reference data, as shown in FIG. 11, the first database 50 and the second database 60 may be merged with each other.

The first database and the second database are configured to be rewritable from the outside. By replacing these databases, various types of data processing and communication control can be achieved using the same communication control apparatus 10. Also, multistage search processing may be performed by providing two or more databases that store reference data to be searched. In such instance, more complicated conditional branching may be performed by providing two or more databases that store search results and processing contents related to each other. When multiple databases are thus provided to conduct multistage search, a plurality of the position detection circuits 32, the index circuits 34, the binary search circuits 36, etc. may also be provided.

The data intended for the foregoing comparison may be compressed by the same compression logic. If both the source data and the target data to be compared are compressed by the same method, the comparison can be performed in the same manner as usual, thus reducing the amount of data to be loaded for comparison. The smaller amount of data to be loaded can reduce the time required to read out the data from the memory, thereby reducing the overall processing time. Moreover, the number of comparators can be also reduced, which contributes to the miniaturization, weight saving, and cost reduction of the apparatus. The data intended for comparison may be stored in a compressed form, or may be read out from the memory and compressed before comparison.

Figure 12:
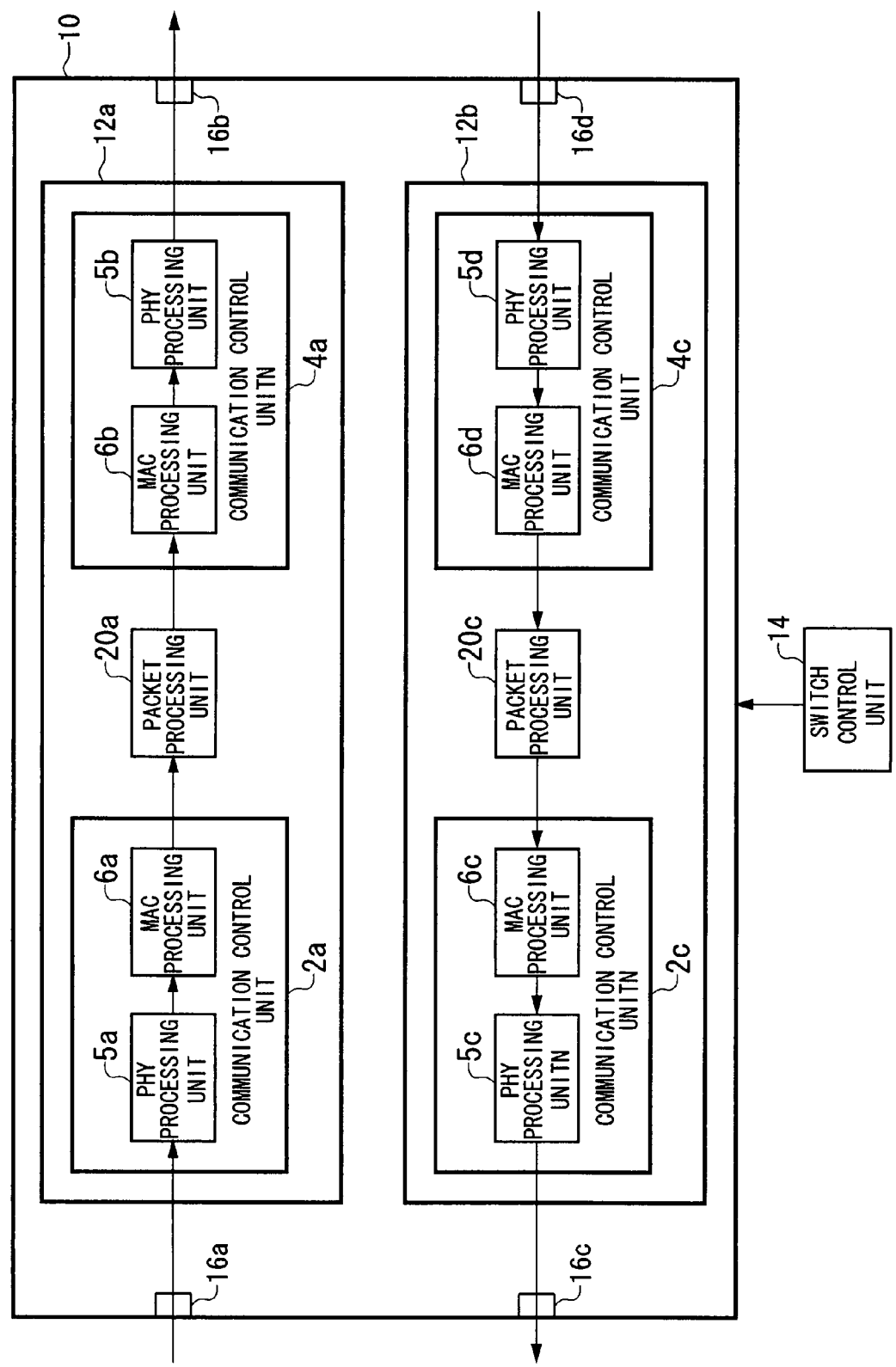
FIG. 12 is a diagram that shows another illustrative configuration of the communication control apparatus according to the base technology.

FIG. 12 shows another illustrative configuration of the communication control apparatus in the base technology. The communication control apparatus 10 shown in this diagram has two communication control units 12, each of which has the same configuration as the communication control apparatus 10 shown in FIG. 3. There is also provided a switch control unit 14 for controlling the operation of the individual communication control units 12. Each of the communication control units 12 has two input/output interfaces 16 and is connected to two networks, upstream and downstream, via the respective input/output interfaces 16. The communication control units 12 receive communication data from either one of the networks and output processed data to the other. The switch control unit 14 switches the inputs and outputs of the input/output interfaces 16 provided for the individual communication control units 12, thereby switching the directions of the flow of communication data in the communication control units 12. This allows communication control not only in one direction but also in both directions.

The switch control unit 14 may provide control such that: either one of the communication control units 12 processes inbound packets and the other processes outbound packets; both the units process inbound packets; or both the units process outbound packets. Consequently, the directions of communications to control can be changed depending on, for example, the traffic status or intended purpose.

The switch control unit 14 may acquire the operation status of the respective communication control units 12 and may switch the direction of communication control according thereto. For example, when one of the communication control units 12 is in a standby state and the other communication control unit 12 is in operation, the unit on standby may be activated as a substitute upon detection of the unit in operation stopping due to a failure or other reasons. This can improve the fault tolerance of the communication control apparatus 10. Also when one of the communication control units 12 needs maintenance such as a database update, the other communication control unit 12 may be operated as a substitute. Thus, appropriate maintenance can be performed without halting the operation of the communication control apparatus 10.

The communication control apparatus 10 may be provided with three or more communication control units 12. The switch control unit 14 may, for example, acquire the traffic status to control the direction of communications in the respective communication control units 12 so that more communication control units 12 are allocated for communication control processing in a direction handling higher traffic. This minimizes a drop in the communication speed, even when the traffic increases in one direction.

The plurality of communication control units 12 may share a part of the communication control unit 2 or 4. The units may also share a part of the packet processing circuit 20, too.

For the data processing apparatus stated above, the following aspects may be provided.

[Aspect 1]

A data processing apparatus comprising:

a first memory unit which contains reference data to be referred to when determining contents of processing to be performed on acquired data;

a search section which searches the data for the reference data by comparing the data and the reference data;

a second memory unit which stores a result of search obtained by the search section and the contents of processing in association with each other; and a processing section which performs the processing associated with the result of search on the data, based on the result of search, wherein the search section is composed of a wired logic circuit.

[Aspect 2]

The data processing apparatus of Aspect 1, wherein the wired logic circuit includes a plurality of first comparison circuits which compare the data with the reference data bit by bit.

[Aspect 3]

The data processing apparatus of Aspect 1, wherein the search section includes a position detection circuit which detects in the data a position of comparison target data to be compared with the reference data.

[Aspect 4]

The data processing apparatus of Aspect 3, wherein the position detection circuit includes a plurality of second comparison circuits which compare the data with position identification data for identifying the position of the comparison target data, and wherein the plurality of second comparison circuits receive the data, each having a shift of a predetermined data length, and compare the data with the position identification data simultaneously in parallel.

[Aspect 5]

The data processing apparatus of Aspect 1 or 2, wherein the search section includes a binary search circuit which searches the data for the reference data by binary search.

[Aspect 6]

The data processing apparatus of Aspect 5, wherein, when the number of pieces of the reference data is smaller than the number of pieces of data storable in the first memory unit, the reference data is stored in the first memory unit in descending order from the last data position, while 0 is stored in the rest of the data.

[Aspect 7]

The data processing apparatus of any one of Aspects 1 to 6, wherein the search section includes a determination circuit which determines which range the comparison target data to be compared with the reference data pertains to, out of three or more ranges into which the plurality of pieces of reference data stored in the first memory unit are divided.

[Aspect 8]

The data processing apparatus of Aspect 7, wherein the determination circuit include a plurality of third comparison circuits which compare reference data at borders of the ranges with the comparison target data so that the plurality of third comparison circuits determine which of the three or more ranges the comparison target data pertains to simultaneously in parallel.

[Aspect 9]

The data processing apparatus of Aspect 8, wherein the reference data stored in predetermined positions of the first memory unit is input to the third comparison circuits as the reference data at the borders.

[Aspect 10]

The data processing apparatus of Aspect 7 or 8, wherein the ranges are determined depending on a distribution of frequencies of occurrence of the reference data in the data.

[Aspect 11]

The data processing apparatus of any one of Aspects 1 to 10, wherein the first memory unit further contains information that indicates the position of the comparison target data in the data, and wherein the search section extracts the comparison target data based on the position-indicating information.

[Aspect 12]

The data processing apparatus of any one of Aspects 1 to 11, wherein the first memory unit or the second memory unit is configured to be rewritable from the outside.

[Aspect 13]

The data processing apparatus of any one of Aspects 1 to 12, wherein, when the search section acquires data in a communication packet to be compared with the reference data, the search section starts comparing the data and the reference data without waiting for the acquisition of all data of the communication packet.

[Aspect 14]

A data processing apparatus comprising a plurality of the data processing apparatuses of any one of Aspects 1 to 13, wherein the data processing apparatuses each have two interfaces which input and output data from/to communication lines, and the direction of processing of the data is changeably controlled by switching the inputs and outputs of the respective interfaces.

Next, a URL filtering technique using the communication control apparatus 10 discussed above will be described.

Figure 13:
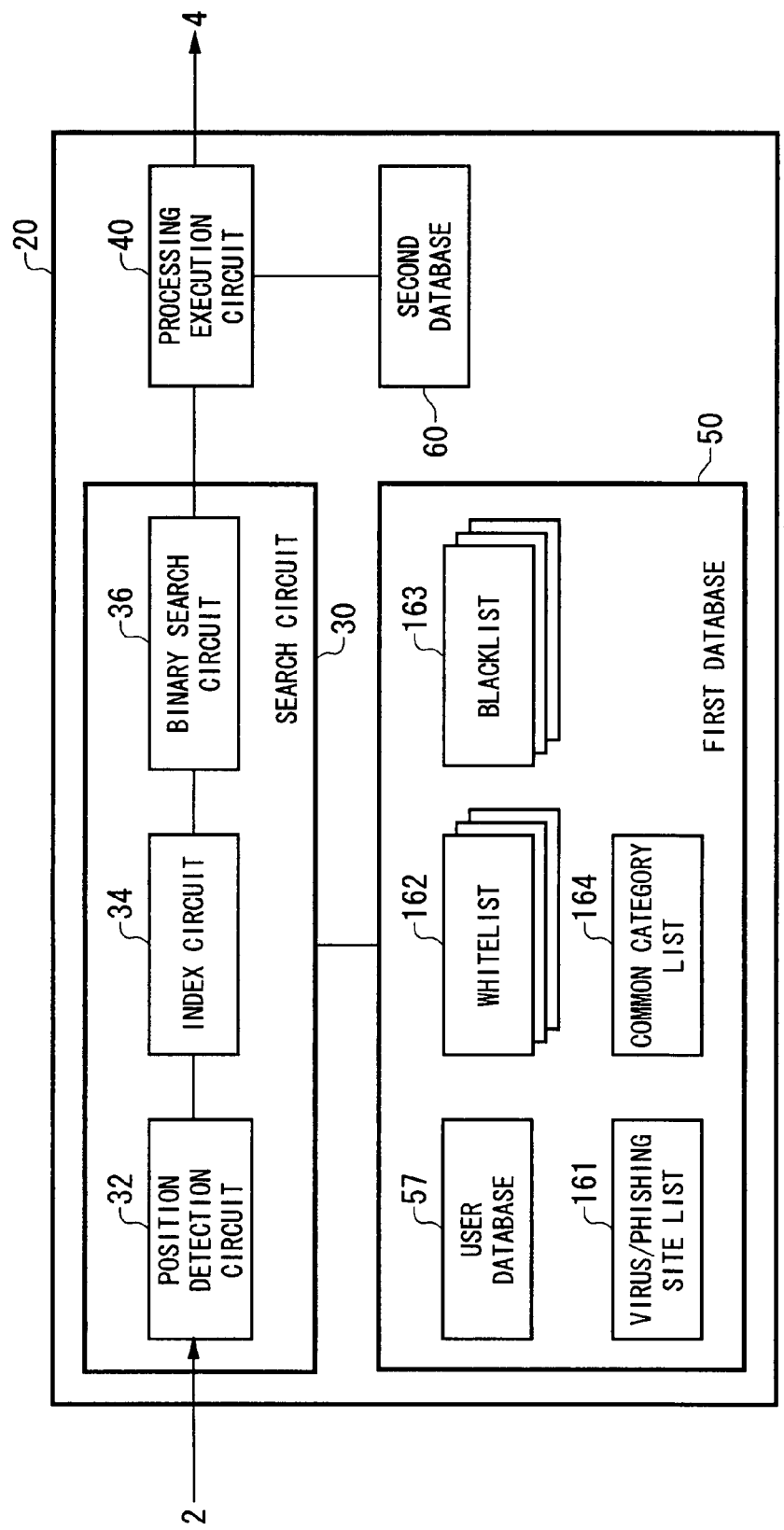
FIG. 13 is a diagram that shows an internal configuration of the packet processing circuit used for URL filtering.

FIG. 13 shows an internal configuration of the packet processing circuit 20 used for URL filtering. The packet processing circuit 20 comprises, as the first database 50, a user database 57, a virus/phishing site list 161, a whitelist 162, a blacklist 163 and a common category list 164. The user database 57 stores information on users who use the communication control apparatus 10. The communication control apparatus 10 receives, from a user, information for identifying the user, and performs matching between the information received by the search circuit 30 therein and the user database 57 to authenticate the user. For the user-identifying information, a source address stored in the IP header of a TCP/IP packet, or a user ID and a password provided by a user may be used. In the former case, storage location of a source address in a packet is already known. Accordingly, when the search circuit 30 performs matching with the user database 57, the position detection circuit 32 needs not to detect the position, and the only thing required there is to specify, as the offset 51, the storage location of the source address. After the user is authenticated as a user registered in the user database 57, the URL of a content is checked against the virus/phishing site list 161, whitelist 162, blacklist 163 and common category list 164, in order to determine whether or not the access to the content should be permitted. The whitelist 162 and blacklist 163 are provided for each user, and when a user ID is uniquely specified after the user authentication, the whitelist 162 and blacklist 163 for the user is provided to the search circuit 30.

The virus/phishing site list 161 contains a list of URLs of contents containing computer viruses, and a list of URLs of "trap" sites used for phishing. If a URL is contained in the virus/phishing site list 161, the request for access to the content having such URL will be denied. Therefore, even when a user is about to access, unconsciously or by a trick, a virus site or phishing site, the access can be appropriately prohibited, thereby protecting the user from a virus or phishing fraud. Also, since the access restrictions are collectively provided by the communication control apparatus 10 on a communication path, not by a user terminal with a list of virus sites or phishing sites stored therein, more reliable and efficient access restrictions can be achieved. The communication control apparatus 10 may acquire and maintain a list of authenticated sites, which have been certified by certification authorities as valid and as not virus sites or phishing sites, to permit access to URLs contained in the list. Also, in a case where a valid website is hacked and a virus is embedded therein or the valid site is used for phishing, the operator of the valid site may register the URL of such hacked website in the virus/phishing site list 161, so as to temporarily prohibit the access to the website until the website is recovered. In addition to the URL list, other information such as IP numbers, TCP numbers and MAC addresses may be checked in combination. Accordingly, prohibition conditions can be set more accurately, thereby ensuring the filtering of virus sites or phishing sites.

The whitelist 162 is provided for each user and contains a list of URLs of contents to which access is permitted. The blacklist 163 is also provided for each user but contains a list of URLs of contents to which access is prohibited. FIG. 14A shows an example of internal data of the virus/phishing site list 161. Similarly, FIG. 14B shows an example of internal data of the whitelist 162, and FIG. 14C shows that of the blacklist 163. Each of the virus/phishing site list 161, whitelist 162 and blacklist 163 contains a category number field 165, a URL field 166 and a title field 167. The URL field 166 contains a URL of a content to which access is permitted or prohibited. The category number field 165 contains a category number of a content. The title field 167 contains a title of a content.

The common category list 164 contains a list for classifying contents represented by URLs into multiple categories. FIG. 15 shows an example of internal data of the common category list 164. The common category list 164 also contains the category number field 165, URL field 166 and title field 167.

The communication control apparatus 10 extracts a URL included in a "GET" request message or the like and searches the virus/phishing site list 161, whitelist 162, blacklist 163 and common category list 164 for the URL using the search circuit 30. At this time, a character string "http://", for example, may be detected by the position detection circuit 32 so as to extract the subsequent data string as target data. Then, the index circuit 34 and binary search circuit 36 perform matching between the extracted URL and the reference data in the virus/phishing site list 161, whitelist 162, blacklist 163 and common category list 164.

FIGS. 16A, 16B, 16C and 16D show examples of internal data of the second database 60 used for URL filtering. FIG. 16A shows the search result and processing content with respect to the virus/phishing site list 161. If a URL included in a GET request or the like matches a URL included in the virus/phishing site list 161, the access to the URL will be prohibited. FIG. 16B shows the search result and processing content with respect to the whitelist 162. If a URL included in a GET request or the like matches a URL included in the whitelist 162, the access to the URL will be permitted. FIG. 16C shows the search result and processing content with respect to the blacklist 163. If a URL included in a GET request or the like matches a URL included in the blacklist 163, the access to the URL will be prohibited.

FIG. 16D shows the search result and processing content with respect to the common category list 164. As shown in FIG. 16D, a user can determine the permission or prohibition of the access to contents for each category that the contents belong to, in relation to the results of search through the common category list 164. The second database 60 for the common category list 164 contains a user ID field 168 and a category field 169. The user ID field 168 contains an ID for identifying a user. The category field 169 contains information that indicates the permission or prohibition of the access to contents belonging to respective categories, which is determined by a user for each of 57 categories classified. If a URL included in a GET request or the like matches a URL included in the common category list 164, the permission for the access to the URL will be determined according to the category that the URL belongs to and the user ID. Although the number of common categories is 57 in FIG. 16D, it is not limited thereto.

Figure 17:
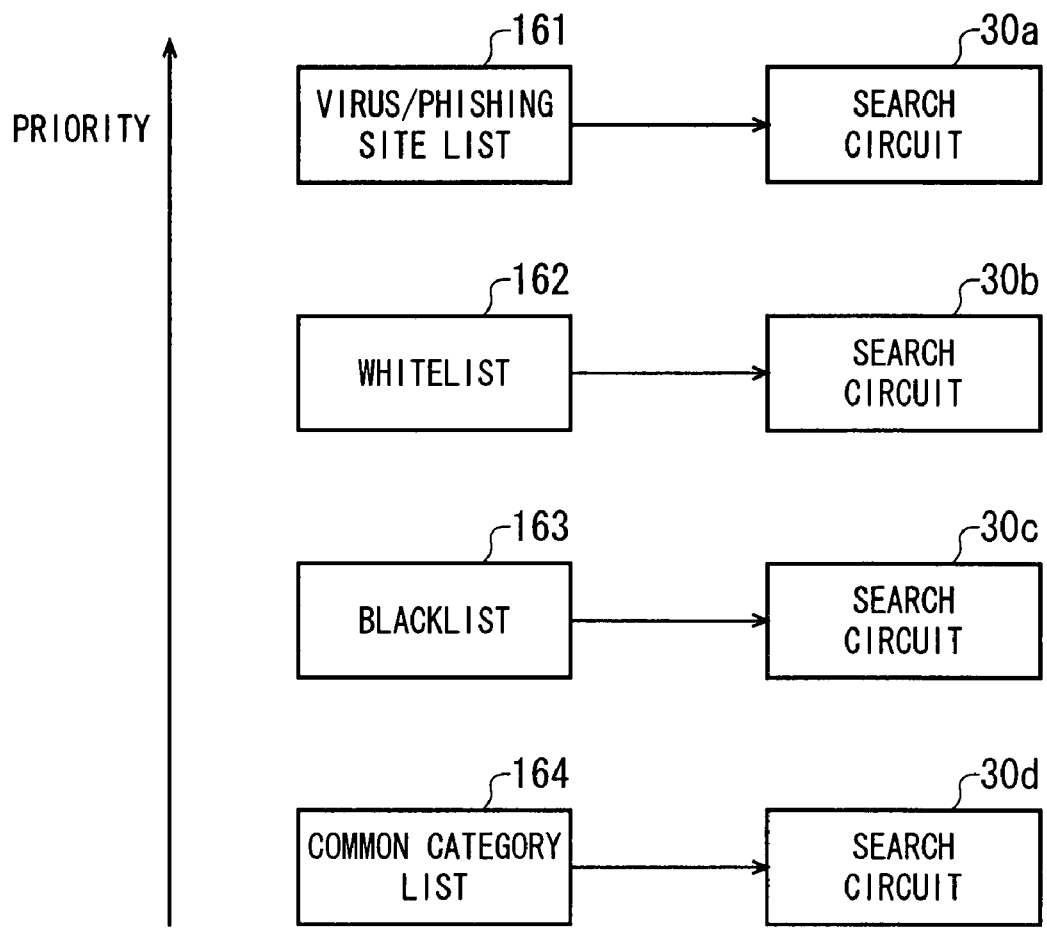
FIG. 17 is a diagram that shows the priorities of the virus/phishing site list, whitelist, blacklist and common category list.

FIG. 17 shows the priorities of the virus/phishing site list 161, whitelist 162, blacklist 163 and common category list 164. In the base technology, the virus/phishing site list 161, whitelist 162, blacklist 163 and common category list 164 have higher priorities in this order. For example, even though a URL of a content appears in the whitelist 162 and the access thereto is permitted, the access will be prohibited if the URL also appears in the virus/phishing site list 161, as it is determined that the content contains a computer virus or is used for phishing.

When conventional software-based matching is performed in consideration of such priorities, the matching is performed on the lists, for example, in descending order of priority and the first match is employed. Alternatively, the matching is performed on lists in ascending order of priority, and the latest match is employed to replace the preceding match. In the base technology using the communication control apparatus 10 configured with a dedicated hardware circuit, in contrast, there are provided a search circuit 30a for performing matching with respect to the virus/phishing site list 161, a search circuit 30b for performing matching with respect to the whitelist 162, a search circuit 30c for performing matching with respect to the blacklist 163, and a search circuit 30d for performing matching with respect to the common category list 164; these search circuits 30 perform matching simultaneously in parallel. When matches are found in multiple lists, the one with the highest priority is employed. Thus, even when multiple databases are provided and the priorities thereof are defined, the search time can be reduced remarkably.

The priorities of the virus/phishing site list 161, whitelist 162, blacklist 163 and common category list 164, with which the permission of access is determined, may be provided in the second database 60, for example. The conditions in the second database 60 may be modified depending on the priorities of the lists.

Therefore, when performing filtering based on URLs using multiple databases, by defining priorities of the databases to perform filtering according thereto, and also by providing the highest priority to the filtering in the virus/phishing site list 161, access to a virus site or phishing site can be certainly prohibited, irrespective of the conditions in the whitelist 162 or the like defined by the user. This can appropriately protect users from viruses or phishing fraud.

When access to a content is permitted, the process execution circuit 40 outputs a signal to the message output server 130 to convey the permission. The message output server 130 then transmits a "GET" request message to the server retaining the content. When access to a content is prohibited, the process execution circuit 40 outputs a signal to the message output server 130 to convey the prohibition, and the message output server 130 then discards a "GET" request message for the server of access destination without transmitting it. At this time, a response message conveying the prohibition of the access may be transmitted to the request source. Alternatively, transfer to another web page may be forced. In this case, the process execution circuit 40 changes the destination address and URL to those of the transfer destination and transmits the "GET" request message. Information including such response message or URL of the transfer destination may be stored in the second database 60 or message output server 130.

The message output server 130 may confirm that the request source exists using a ping command or the like, and may subsequently check the condition of the request source before outputting a message thereto. A message transmitted from the message output server 130 to the request source may be determined for each user, for each content or each category of contents to be accessed, or for each database such as the whitelist 162 or blacklist 163. For example, the screen displayed when access is prohibited may be customized by a user and registered in the message output server 130. Also, as stated previously, when a valid website is hacked and the access thereto is temporarily restricted, a message may be output in order to direct users to a mirror site of the valid site.

The message output server 130 may manage the history of message transmission so that the history information may be used for various kinds of control. For example, when a number of access requests are transmitted from the same request source for a short time, since it may possibly be a denial-of-service attack (DoS attack), such request source may be registered in an access denial list so as to block packets from the request source without transmitting them to the request destination. Also, the history of message transmission may be statistically processed to be provided to the operator of the website, etc. Accordingly, the history of user access can be used for marketing, control of communication status or other purposes. The number of message transmission may be decreased or increased depending on the situation. For example, when an access request is transmitted from a certain IP number, messages to be transmitted can be increased manyfold in response to the single request message.

With the configuration and operation as described above, access to an inappropriate content can be prohibited. Also, since the search circuit 30 is a dedicated hardware circuit configured with FPGA, etc., high-speed search processing can be achieved, as discussed previously, and filtering process can be performed with minimal effect on the traffic. By providing such filtering service, an Internet service provider can provide added value, thus gaining more users.

The whitelist 162 or blacklist 163 may be mutually provided for all users.

Embodiment

An embodiment proposes a reliable technique for preventing access to phishing sites. The embodiment also proposes a technique for constructing, using such access control technique, a communication system with which users can enjoy network services safely, and a business model for operating such system effectively.

As described in the base technology, the communication control apparatus 10 stores URLs of phishing sites. When a user is about to access a phishing site, the apparatus finds, through URL matching, that the access destination is a phishing site and prohibits the access thereto. More specifically, the virus/phishing site list 161 is provided to contain a list of URLs of phishing sites, which masquerade as valid websites and are provided with an attempt to acquire private information including card numbers, PIN numbers and passwords, from users illegally. When the communication control unit 2 receives, via a network, a packet that contains communication data for requesting access to a content, the search circuit 30 compares the URL of the content to be accessed included in the communication data, with URLs of phishing sites included in the virus/phishing site list 161. If the address of the content to be accessed matches a URL of a phishing site, the process execution circuit 40 will prohibit the access to the content. In such case, the process execution circuit 40 may discard the packet for requesting the access, or may return an error message or the like to the source of the access request. Alternatively, the process execution circuit 40 may instruct the message output server 130 to output a message, so that the message output server 130 transmits an error message or the like to the source of the access request.

With such technique, access to a phishing site can be prevented appropriately. Next, there will be proposed a business model employing such technique for restricting access to phishing sites.

Figure 18:
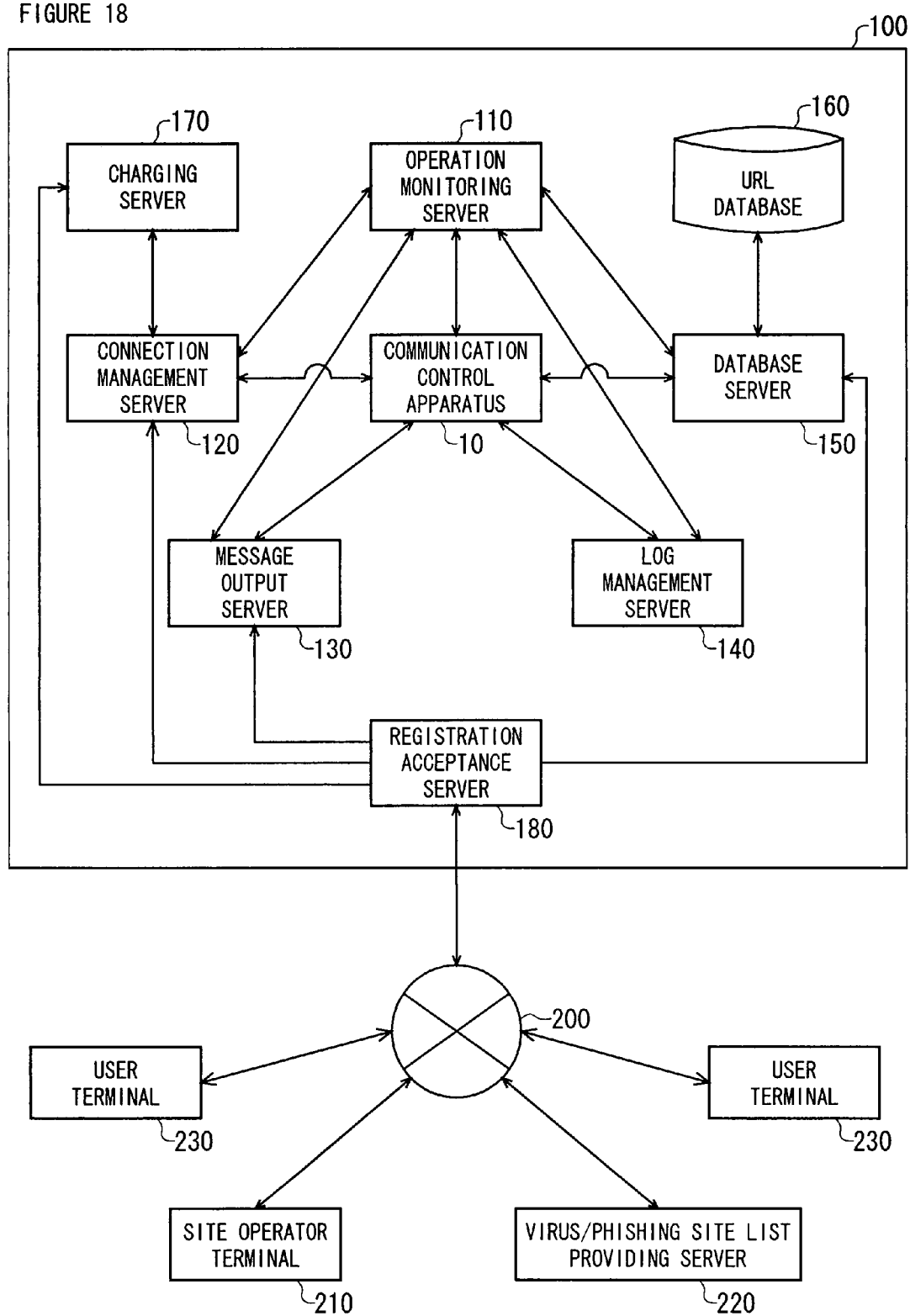
FIG. 18 is a diagram that shows a configuration of a communication control system according to an embodiment.

FIG. 18 shows a configuration of a communication control system according to the embodiment. The communication control system 100 of the present embodiment comprises a charging server 170 and a registration acceptance server 180 in addition to the configuration of the communication control system 100 of the base technology shown in FIG. 1. Other configurations and operations are the same as those in the base technology. The registration acceptance server 180, a site operator terminal 210, a virus/phishing site list providing server 220, and user terminals 230 are all connected to the Internet 200, which is an example of the network.

First, the mechanism of gathering a list of URLs of phishing sites will be described. The registration acceptance server 180 accepts a URL of a phishing site and registers the URL thus accepted in a virus/phishing site list in the database server 150. The database server 150 then updates the database of the communication control apparatus 10 at a certain time. Thus, the URL of the phishing site thus registered is reflected in the virus/phishing site list 161 in the communication control apparatus 10.

The registration acceptance server 180 may accept the registration of a URL of a phishing site from the virus/phishing site list providing server 220, which is operated by a service or the like that creates a list of phishing sites. In such case, the registration acceptance server 180 may request the charging server 170 to pay a certain fee to the service, in consideration of the provision of the phishing site list. The charging server 170 stores a table for managing charging information, and when requested by the registration acceptance server 180 to pay a fee to a service in consideration of a phishing site list, the charging server 170 performs processing for crediting a certain fee to the service's account.

The registration acceptance server 180 may accept a URL of a phishing site also from the site operator terminal 210 or user terminal 230. In such case, the registration acceptance server 180 may provide a web page or the like for accepting URLs of phishing sites and accept a URL of a phishing site from the site operator terminal 210 or user terminal 230 thereon. The registration acceptance server 180 may confirm that the accepted URL is a URL of an actual phishing site before registering the URL in the database server 150. Also in this case, the charging server 170 may be requested to pay a certain fee to the informant.

Thus, the business model described above enables efficient gathering of URLs of phishing sites and more reliable prevention of access to such phishing sites.

If a valid site run by the site operator is hacked and a web page therein is tampered with, so that the site is temporarily used as a phishing site, the site operator terminal 210 may register the URL of such valid site as a URL of a phishing site in the virus/phishing site list 161, in order to temporarily prohibit the access to the site. In such case, the site operator terminal 210 may register a message to be presented to a user intending to view the valid site. Such message may, for example, be registered in a message field, which is provided in the virus/phishing site list 161 shown in FIG. 14A to contain a message or the path to a file storing a message. Alternatively, the message output server 130 may store a table that contains URLs and messages related to each other.

When access to the valid site registered in the virus/phishing site list 161 is requested, the message output server 130 returns a registered message instead of providing a web page in the valid site. The message may inform the user that the valid site cannot be viewed temporarily. Also, the message may contain a link to a mirror site to direct the user thereto. Thus, the technique of the embodiment provides appropriate access control also in a case where access should be prohibited temporarily.

When a site operator registers in the virus/phishing site list 161 a URL of a website that the operator runs, a certain fee may be charged to the site operator in consideration of the registration. Also, in consideration of the presentation of a message to a user who has requested access to such website, another certain fee may be charged to the site operator. In such cases, the registration acceptance server 180 requests the charging server 170 to charge a certain fee to the site operator. The charging server 170 then performs processing for deducting the certain fee from the operator's account.

A business model for operating a filtering service using the virus/phishing site list 161 will now be explained. When a user wishes to use a phishing-site filtering service provided by the communication control apparatus 10, the user accesses the registration acceptance server 180 from the user terminal 230 via the Internet 200 and makes registration for the phishing-site filtering service. The registration acceptance server 180 may present a web page on the user terminal 230 so as to accept the registration for the access control service for phishing sites thereon. After the registration acceptance server 180 accepts an entry of private information and the like from a user, the user is registered in a user database in the connection management server 120. Thereafter, the user can enjoy the phishing-site filtering service.

When the connection management server 120 receives from a user a packet for requesting access to a content, the server refers to the user database to check if the user is a registered user. After the user is authenticated as a registered user, the connection management server 120 permits the user to use the phishing-site filtering service and allows the communication control apparatus 10 to perform matching with the virus/phishing site list 161.

If a registration fee for the service is charged to a user, the registration acceptance server 180 will request the charging server 170 to charge the fee. The charging server 170 will then deduct the registration fee from the user's account. When the charging server 170 completes the charging process, the registration acceptance server 180 registers information on the user in the connection management server 120. If a usage fee for the filtering process is charged, the connection management server 120 will, upon reception of a request for access to a content, request the charging server 170 to charge the fee to the user who has requested the access. When the charging server 170 completes the charging process, the connection management server 120 instructs the communication control apparatus 10 to perform filtering process.

Thus, with such business model described above, a service provider of the phishing-site filtering service can gather URLs of a larger number of phishing sites and provide more secure services. Also, business can be established by charging a fee in consideration of the service with added value.

Figure 19:
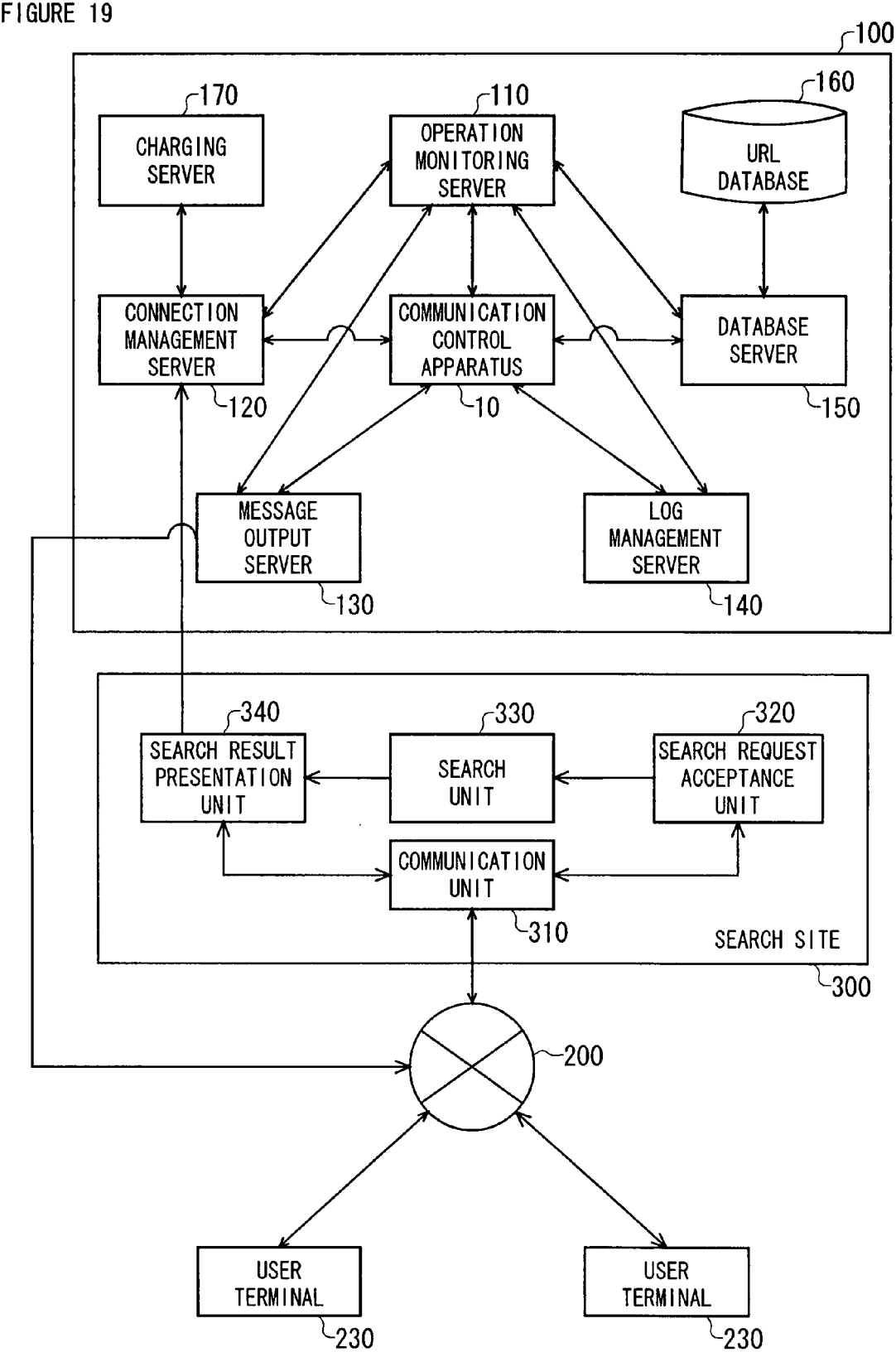
FIG. 19 is a diagram that shows another configuration of the communication control system according to the embodiment.

FIG. 19 shows a system configuration for providing the phishing-site filtering service on a search site. A search site 300 is a website for accepting from the user terminal 230 a search request for a web page and presenting the search result. The communication control system 100 shown in FIG. 19 provides a service in which, when a user is about to access a web page that has been presented as a search result on the search site 300, the permission for the access is controlled.

A communication unit 310 controls communications between the search site 300 and the user terminals 230. A search request acceptance unit 320 provides to the user terminal 230 an interface for accepting an entry of a search keyword or the like and accepts a search request from the user terminal 230. A search unit 330 searches for a web page that matches a search request accepted by the search request acceptance unit 320. A search result presentation unit 340 presents a search result of the search unit 330.

When a user clicks a link to a desired web page to access, among a list of web pages presented by the search result presentation unit 340, the access request is transmitted to the communication control system 100. Upon reception of the access request, the connection management server 120 authenticates the user who has made the access request before allowing the communication control apparatus 10 to perform access control processing, as described in the base technology. The communication control apparatus 10 performs matching with URLs registered in the first database 50 according to the conditions provided by the user who has made the access request, so as to determine whether or not the access should be permitted. When the access is prohibited, a message is transmitted from the message output server 130 to the user terminal 230.

Thus, also when accessing a web page presented by the search site 300, the permission for the access can be determined appropriately, thus enabling reliable access control. Particularly, since access to virus sites or phishing sites can be certainly prohibited, the search site 300 can provide links to secure web pages, so that users can enjoy the service of the search site 300 safely.

Before the search result presentation unit 340 presents the search result, it may be determined if the web page extracted by the search belongs to a virus site or phishing site, so as not to present a web page to which access should be prohibited. In such case, the search result presentation unit 340 notifies the communication control system 100 of the URL of the web page searched by the search unit 330 to allow the communication control system 100 to determine whether or not the access to the URL should be permitted. Consequently, the search result presentation unit 340 only presents to users URLs of web pages to which access has been permitted by the communication control system 100. Thus, insecure web pages can be excluded, providing more secure services.

In consideration of such search service, a certain fee may be charged to a user. In this case, as with the example described above, the charging server 170 may charge a registration fee upon user registration or may charge a usage fee upon use of the search service.

This business model is applicable to any websites, besides search sites, that provide links to other web pages, such as portal sites and blog sites. The security of a website can be enhanced by providing the communication control system 100 of the present embodiment in building the website to provide a service in which, when a user is about to jump from the website to another web page, access to a virus site or phishing site can be appropriately prohibited. Consequently, a service with added value of enhanced security can be provided to users, encouraging more users to use the service.

In the present embodiment, a list of virus sites and phishing sites are acquired to prohibit access to web pages that match the list. Conversely, a list of websites certified by certificate authorities may be acquired as a whitelist, so as to prohibit access to websites that do not match the list.

The present invention has been described with reference to the embodiment. The embodiment is intended to be illustrative only and it will be obvious to those skilled in the art that various modifications to constituting elements or processes could be developed and that such modifications are also within the scope of the present invention.

INDUSTRIAL APPLICABILITY

The present invention is applicable to a communication control system that controls access to illegal websites including phishing sites.

The invention claimed is:

1. A communication control system comprising one or more non-transitory, processor readable media wherein said media is encoded with data comprising:
a maintaining unit which maintains a list of addresses of illegal web pages in a phishing site which masquerades as a valid website and comprises an interface for prompting a user to enter information;
a receiving unit which receives, via a network, communication data for requesting access to a content;
a comparison unit which compares the address of the content included in the communication data with an address of an illegal web page included in the list;
an access control unit which prohibits access to the content with the address of the content matches the address of the illegal web page;
a message output unit which, when the access control unit prohibits access to the content, transmits a predetermined message to the source of the access request, instead of data of the content; and
a list registration unit which accepts the address of the illegal web page and registers the address in the list, wherein:
the comparison unit comprises dedicated hardware employing a wired logic circuit including a plurality of comparison circuits which compares, bit by bit, the address data of the content included in the communication data, with the address data of the illegal web page included in the list, and performs bit matching on the plurality of bits simultaneously;
the list registration unit further accepts a message including a link to a valid website or mirror site of the valid website as a message to be transmitted, upon reception of a request for access to the illegal web page, to the source of the access request, when said unit accepts the address of the web page; and
the message output unit transmits the message accepted by the list registration unit instead of data of the illegal web page, upon reception of a request for access to the illegal web page.

2. The communication system of claim 1, further comprising a charging unit which manages charging information, wherein:
the list registration unit requests the charging unit to pay a fee to a registrant upon acceptance of the address of the illegal web page; and
the charging unit performs processing for paying the fee to the registrant.

3. The communication control system of claim 1, further comprising:
a search request acceptance unit which accepts a search request for a web page;
a search unit which searches for a web page that matches a search request accepted by the search request acceptance unit; and
a search result presentation unit which presents a search result of the search unit;
wherein,
the communication control system prohibits, upon accepting a request for access to a web page included in the search result presented by the search result presentation unit, access to the web page when the web page is an illegal web page.

4. The communication control system of claim 1, further comprising:
a search request acceptance unit which accepts a search request for a web page;
a search unit which searches for a web page that matches a search request accepted by the search request acceptance unit; and
a search result presentation unit which presents the search result of the search unit, wherein
the comparison unit compares an address of a web page included in the search result of the search unit, with an address of the illegal web page included in the list, and
the search result presentation unit only presents a web page that is not the illegal web page, in the search result of the search unit.

5. The communication control system of claim 1, wherein all communication data received by the receiving unit for requesting access to the content are process by the comparison unit and the access control unit regardless of the need for access control.

6. The communication control system of claim 2, wherein:
the list registration unit requests the charging unit, which manages charging information, to charge a fee to a registrant upon acceptance of the message; and
the charging unit performs processing for charging the fee to the registrant.

7. The communication control system of claim 2, further comprising:
a use request acceptance unit which accepts from a user a request for a use of a service provided by the communication control system, in which access to the illegal web page is controlled;
wherein:
the use request acceptance unit requests the charging unit to charge a fee to a user upon accepting from the user a request for a use of the service; and
the charging unit performs processing for charging the fee to the user.

8. The communication control system of claim 2, wherein:
the list registration unit requests a charging unit, which manages charging information, to charge a fee to a registrant upon acceptance of the message; and
the charging unit performs processing for charging the fee to the registrant.

9. The communication control system of claim 2, further comprising:
a use request acceptance unit which accepts from a user a request for a use of a service provided by the communication control system, in which access to the illegal web page is controlled; and
a charging unit which manages charging information, wherein:
the use request acceptance unit requests the charging unit to charge a fee to a user upon accepting from the user a request for a use of the service; and
the charging unit performs processing for charging the fee to the user.

10. The communication control system of claim 2, further comprising:
a search request acceptance unit which accepts a search request for a web page;
a search unit which searches for a web page that matches a search request accepted by the search request acceptance unit; and
a search result presentation unit which presents a search result of the search unit;
wherein,
the communication control system prohibits, upon accepting a request for access to a web page included in the search result presented by the search result presentation unit, access to the web page when the web page is an illegal web page.

11. A communication control system, comprising:
a maintaining unit which maintains a list of addresses of illegal web pages in a phishing site which masquerades as a valid website and comprises an interface for prompting a user to enter information;
a receiving unit which receives, via a network, communication data for requesting access to a content;
a comparison unit which compares the address of the content included in the communication data with an address of an illegal web page included in the list;
an access control unit which prohibits access to the content with the address of the content matches the address of the illegal web page;
a message output unit which, when the access control unit prohibits access to the content, transmits a predetermined message to the source of the access request, instead of data of the content; and
a list registration unit which accepts the address of the illegal web page and registers the address in the list, wherein:
the comparison unit comprises dedicated hardware employing a wired logic circuit including a plurality of comparison circuits which compares, bit by bit, the address data of the content included in the communication data, with the address data of the illegal web page included in the list, and performs bit matching on the plurality of bits simultaneously;
the list registration unit further accepts a message including a link to a valid website or mirror site of the valid website as a message to be transmitted, upon reception of a request for access to the illegal web page, to the source of the access request, when said unit accepts the address of the web page; and
the message output unit transmits the message accepted by the list registration unit instead of data of the illegal web page, upon reception of a request for access to the illegal web page.

12. The communication system of claim 11, further comprising a charging unit which manages charging information, wherein:
the list registration unit requests the charging unit to pay a fee to a registrant upon acceptance of the address of the illegal web page; and
the charging unit performs processing for paying the fee to the registrant.

13. The communication control system of claim 11, wherein:
the list registration unit requests a charging unit, which manages charging information, to charge a fee to a registrant upon acceptance of the message; and
the charging unit performs processing for charging the fee to the registrant.

14. The communication control system of claim 11, further comprising:
a use request acceptance unit which accepts from a user a request for a use of a service provided by the communication control apparatus, in which access to the illegal web page is controlled; and
a charging unit which manages charging information, wherein:
the use request acceptance unit requests the charging unit to charge a fee to a user upon accepting from the user a request for a use of the service; and
the charging unit performs processing for charging the fee to the user.

15. The communication control system of claim 11, wherein all communication data received by the receiving unit for requesting access to the content are process by the comparison unit and the access control unit regardless of the need for access control.

* * * * *